US012778006B2

(12) United States Patent
Clark et al.

(10) Patent No.: US 12,778,006 B2
(45) Date of Patent: Nov. 3, 2026

(54) REMOTE MONITORING FOR DETECTING CROP LOSS

(71) Applicant: Deere & Company, Moline, IL (US)

(72) Inventors: Scott N. Clark, Bettendorf, IA (US); Nathan R. Vandike, Geneseo, IL (US)

(73) Assignee: Deere & Company, Moline, IL (US)

( * ) Notice: Subject to any disclaimer, the term of this patent is extended or adjusted under 35 U.S.C. 154(b) by 254 days.

(21) Appl. No.: 18/767,696

(22) Filed: Jul. 9, 2024

(65) Prior Publication Data

US 2026/0013432 A1 Jan. 15, 2026

(51) Int. Cl.
*A01D 41/127* (2006.01)
*A01B 79/00* (2006.01)

(52) U.S. Cl.
CPC .................................. *A01D 41/127* (2013.01)

(58) Field of Classification Search
CPC ... A01D 41/127; A01D 41/1273; F01B 79/00; F01B 79/005; G06V 20/10
See application file for complete search history.

(56) References Cited

U.S. PATENT DOCUMENTS

| | | | |
|---|---|---|---|
| 7,721,515 | B2 | 5/2010 | Pollklas et al. |
| 8,909,389 | B2 | 12/2014 | Meyer |
| 9,050,890 | B2 | 6/2015 | Buerkle et al. |
| 9,740,208 | B2 | 8/2017 | Sugumaran et al. |
| 9,807,933 | B2 | 11/2017 | Boyd et al. |
| 9,829,883 | B1 | 11/2017 | Lavoie et al. |
| 10,049,296 | B2 | 8/2018 | Walker |
| 10,255,670 | B1 | 4/2019 | Wu et al. |
| 10,377,197 | B2 | 8/2019 | Fukatsu et al. |
| 10,721,859 | B2 | 7/2020 | Wu et al. |
| 10,754,353 | B2 | 8/2020 | Sporrer et al. |
| 10,761,544 | B2 | 9/2020 | Anderson et al. |
| 11,017,306 | B2 | 5/2021 | Sood et al. |
| 11,112,262 | B2 | 9/2021 | Anderson |
| 11,308,735 | B2 | 4/2022 | Wagner et al. |
| 11,324,164 | B2 | 5/2022 | Sorensen |
| 11,470,776 | B2 | 10/2022 | Barther et al. |
| 11,483,972 | B2 | 11/2022 | Dima et al. |

(Continued)

FOREIGN PATENT DOCUMENTS

| | | | |
|---|---|---|---|
| CN | 113287422 | A | 8/2021 |
| DE | 102014201203 | A1 | 7/2015 |

(Continued)

*Primary Examiner* — Tan Q Nguyen
(74) *Attorney, Agent, or Firm* — Christopher J. Volkmann; KELLY, HOLT & CHRISTENSON PLLC

(57) ABSTRACT

A crop loss monitoring method includes detecting crop loss in a measurement area when the measurement area corresponds to an unharvested area of a field and generating pre-harvest crop loss sensor data based thereon. The method further includes detecting crop loss in the measurement area when the measurement area is behind a distal end of a header of a harvester and generating harvesting crop loss sensor data based thereon. The method further includes identifying a pre-harvest crop loss value based on the pre-harvest crop loss sensor data, identifying a harvesting crop loss value based on the harvesting crop loss sensor data and the pre-harvest crop loss value, and generating one or more control signals based on at least one of the pre-harvest crop loss value or the harvesting crop loss value.

20 Claims, 21 Drawing Sheets

(56) References Cited

U.S. PATENT DOCUMENTS

| | | | |
|---|---|---|---|
| 11,499,295 B2 | 11/2022 | Anderson | |
| 11,758,844 B2 | 9/2023 | White et al. | |
| 2006/0020402 A1 | 1/2006 | Bischoff et al. | |
| 2006/0196158 A1 | 9/2006 | Faivre et al. | |
| 2016/0330906 A1* | 11/2016 | Acheson | A01D 41/127 |
| 2019/0227554 A1 | 7/2019 | Cantrell et al. | |
| 2020/0264154 A1 | 8/2020 | Saez et al. | |
| 2021/0357664 A1 | 11/2021 | Kocer et al. | |
| 2022/0138868 A1 | 5/2022 | Jarugumilli et al. | |
| 2022/0225568 A1* | 7/2022 | Töniges | G06N 3/09 |
| 2022/0232770 A1* | 7/2022 | Yanke | A01D 41/141 |
| 2022/0348322 A1 | 11/2022 | Zemenchik | |
| 2022/0383428 A1* | 12/2022 | Bhagat | G06Q 10/06315 |
| 2023/0000015 A1 | 1/2023 | Todd et al. | |
| 2023/0012175 A1* | 1/2023 | Edo | G06V 10/82 |
| 2023/0337580 A1* | 10/2023 | Natarajan | A01D 41/127 |
| 2023/0345873 A1 | 11/2023 | Jorre et al. | |
| 2023/0397533 A1* | 12/2023 | Iseringhausen | A01D 41/1276 |
| 2024/0130280 A1 | 4/2024 | Ganssle | |
| 2024/0292788 A1* | 9/2024 | Missotten | A01F 12/446 |

FOREIGN PATENT DOCUMENTS

| | | |
|---|---|---|
| DE | 102015224175 B3 | 4/2017 |
| DE | 102016202628 A1 | 8/2017 |
| EP | 2545761 B1 | 12/2016 |
| EP | 3401854 A1 | 11/2018 |
| EP | 3284334 B1 | 4/2019 |
| EP | 3552474 B1 | 8/2021 |
| IN | 202241068395 A | 2/2022 |
| JP | 2021058099 A | 4/2021 |
| WO | 2023021005 A1 | 2/2023 |
| WO | 2023047240 A1 | 3/2023 |
| WO | 2023187494 A1 | 10/2023 |

* cited by examiner

REMOTE MONITORING FOR DETECTING CROP LOSS

FIELD OF THE DESCRIPTION

The present description relates to agricultural worksite operations. More specifically, the present description relates to drone-based remote monitoring and control of agricultural worksite operations, such as an agricultural harvesting operation.

BACKGROUND

There are a wide variety of different types of agricultural worksite operations. During an agricultural worksite operation, one or more agricultural work machines operate at a worksite, which can include on or more fields, to carry out the operation. The one or more agricultural work machines can be controlled during the operation based on attributes detected at the worksite. One example of an agricultural worksite operation is an agricultural harvesting operation. During an agricultural harvesting operation, one or more agricultural harvesting machines harvest crop at the worksite.

The discussion above is merely provided for general background information and is not intended to be used as an aid in determining the scope of the claimed subject matter.

SUMMARY

A crop loss monitoring method includes detecting crop loss in a measurement area when the measurement area corresponds to an unharvested area of a field, generating pre-harvest crop loss sensor data indicative of the crop loss detected in the measurement area when the measurement area corresponds to the unharvested area of the field, and identifying a pre-harvest crop loss value based on the pre-harvest crop loss sensor data. The method further includes detecting crop loss in the measurement area when the measurement area is behind a distal end of a header of a harvester, generating harvesting crop loss sensor data indicative of the crop loss detected in the measurement area when the measurement area is behind the distal end of the header, identifying a harvesting crop loss value based on the harvesting crop loss sensor data and the pre-harvest crop loss value. The method further includes generating one or more control signals based on at least one of the pre-harvest crop loss value or the harvesting crop loss value.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1B:
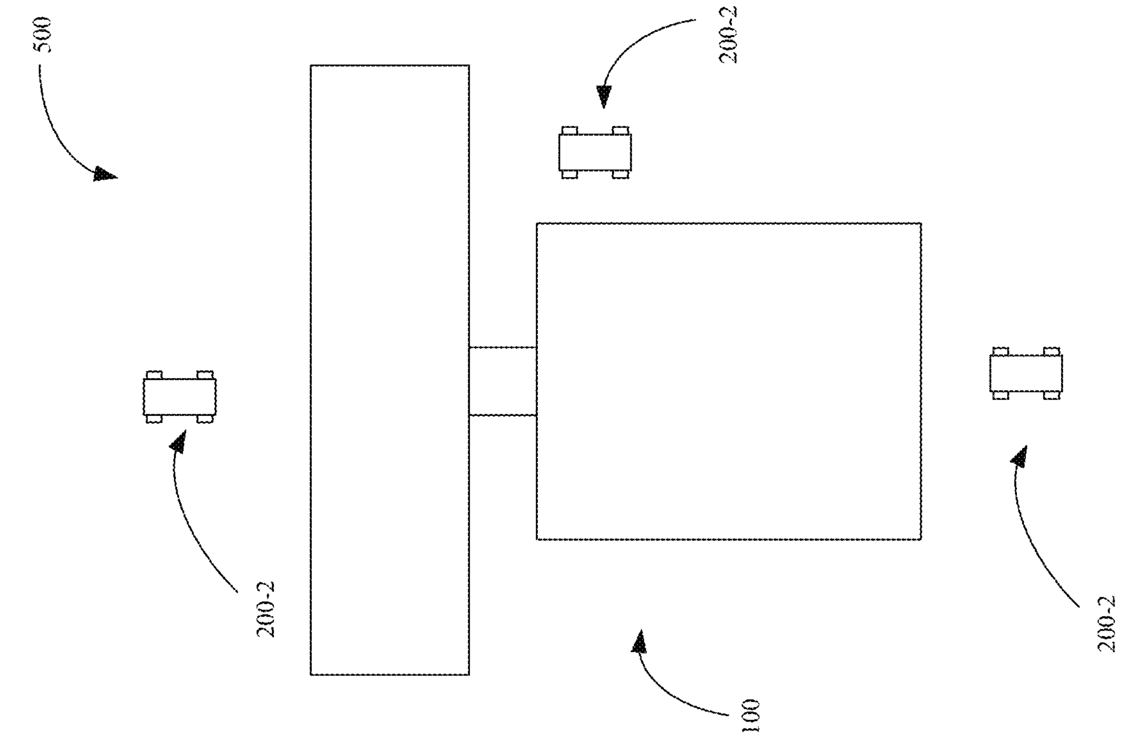
FIGS. 1A-1B are pictorial illustration showing an example agricultural system.

For the purpose of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example can be combined with the features, components, and/or steps described with respect to other examples of the present disclosure.

During an agricultural harvesting operation, one or more harvesters operate at a worksite (e.g., field) to harvest crop. Operating parameters (e.g., machine settings, route, etc.) of the harvesters can be controlled, during the harvesting operation, based on attributes detected at the worksite. One example attribute is crop loss (e.g., grain loss, etc.). Crop (e.g., grain) loss is an attribute representing an amount of crop (e.g., grain) unharvested by the harvesters during the harvesting operation. Crop loss can occur for a variety of reasons and from a variety of processes of a harvester. For example, crop can break from the crop plants when engaged by the harvester and fall to the ground, the harvester can miss (e.g., fail to engage or fail to gather) crop plants, crop can bounce out of a header of the harvester, crop can be broken, shattered, or shelled by crop engaging components on the header, crop can be intermingled and dispersed with non-crop material (i.e., failure to separate crop from non-crop material), as well as in other ways.

In some current systems, sensors on-board a harvester can be used to detect some crop loss which can be utilized by a control system to control one or more operating parameters of the harvester.

However, sensors on-board the harvester can face challenges. For one, the detection characteristics (e.g., measurement area (e.g., field of view, etc.), measurement angle (e.g., viewing angle, etc.), distance from object(s) to be detected, etc.) of the sensor on-board the harvester can be less than ideal for the detection of crop loss, or at least, are less optimal relative to a remotely positionable sensor such as that on a drone (e.g., unmanned aerial vehicle (UAV), unmanned ground vehicle (UGV, etc.). The detection characteristics of sensors on-board the harvester can also be difficult to adjust. Further, even where the detection characteristics of sensors on-board the harvester can be selectively adjusted, given that sensors on-board the work machine travel along with the harvester, the detection characteristics of the sensors on-board the harvester are, at least somewhat, dependent on the current location and orientation of the harvester. In some examples, a plurality of sensors on-board the harvester can be used, each having respective detection characteristics (e.g., respective measurement area, etc.). However, the use of additional sensors on-board the work machine can increase expense and processing complexity. Further, the sensors on-board the harvester can be obstructed by various types of obstructions at the worksite, such as debris (e.g., dust, crop material, other material, etc.) clouds, as well as various other obstructions. One example of a debris cloud is a debris cloud generated by a harvester, or the header of the harvester, as it engages, cuts, and processes crop plants. The obstructions can lead to error in the detection of crop loss, or, in some examples, prevent detection altogether. It can be difficult to compensate for (e.g., detect in spite of) the obstructions with on-board sensors. Further, on-board sensors can suffer detection errors (e.g., lower quality images, sensor signal noise, etc.) due to bouncing or vibration of the machine to which they are attached.

Additionally, crop loss has multiple categories: pre-harvest crop loss (crop loss prior to harvesting); and harvesting crop loss (crop loss during (or due to) harvesting). Depending on the type of harvester, harvesting crop-loss can have multiple subcategories: header crop loss (crop loss due to header operation or crop lost from header); and machine crop loss (crop loss due to machine operation, such as separation error). As used herein, a pre-harvest crop loss value is a value quantifying pre-harvest crop loss. As used herein, a harvesting crop loss value can be, in the example where harvesting crop loss includes both header crop loss and machine crop loss, a header crop loss value, machine crop loss value, or a value that is a combination (e.g., aggregation) of a header crop loss value and a machine crop loss value. A header crop loss value is a value quantifying header crop loss. A machine crop loss value is a value quantifying machine crop loss. In an example in which harvest crop loss does not include both header crop loss and machine crop loss, a harvesting crop loss value is a value quantifying crop loss during (or due to) harvesting, where the crop loss is detected in an area behind a forward or distal end of the header of the harvester.

Current systems do not account for pre-harvest crop loss. For example, in some current systems, crop loss is detected behind the header or behind the machine, or both. However, a portion of the crop loss may be pre-harvest crop loss (e.g., crop that separated from crop plant prior to harvesting). In current systems, the portion due to pre-harvest crop loss is not accounted for and thus, adjustments to machine operation may be less than ideal or may provide satisfactory results. For example, in a current system, a crop loss of three and a half (3.5) bushels per acre (e.g., two percent (2%) for one hundred and seventy five (175) bushel per acre crop) may be detected behind the header or behind the machine. However, two (2) bushels per acre (or about one point one percent (1.1%)) may be attributable to pre-harvest loss. In a current system, the harvester May be adjusted based on the 2% crop loss rather than the perhaps appropriate 0.9% crop loss attributable to harvesting loss. This adjustment may be deleterious to other performance aspects of the harvester. The adjustment may result in a less than desirable result. Further, the inaccuracy of the crop loss may have a deleterious effect on control algorithm learning. Additionally, it is useful for growers to know accurate attributions of crop loss, for example, for purposes of control during a current operation but also for future seasons.

It would be useful to have a system that could overcome the challenges faced by sensors on-board the harvester while still providing crop loss sensor data for use in control. Such a system could include a sensor system remotely positionable from the harvester, capable of detecting crop loss (both pre-harvest and harvesting crop loss). Examples described herein proceed with utilization of one or more unmanned vehicles (drones), such as one or more unmanned aerial vehicles (UAVs) or unmanned ground vehicles (UGVs), or both, that each include a sensor system capable to detect crop loss and generate crop loss sensor data indicative of, the detected crop loss, for use in control (e.g., control of the harvester, control of an interface mechanism, etc.). Each drone is controllably positionable, remote from and relative to the harvester and/or relative to a location at the worksite. The travel path of a drone can be controlled such that the drone is positioned to detect crop loss in various measurement areas in a desired way (e.g., at given locations and for a desired amount of time, from a desired perspective, etc.). In some examples, a drone can be docked on the harvester. In some examples, the drone can be tethered to the harvester.

The present disclosure encompasses systems, methods, and apparatuses for agricultural harvesting systems that perform agricultural harvesting operations using combine harvesters and forage harvesters (collectively referred to herein as "harvesters")t.

Figure 1A:
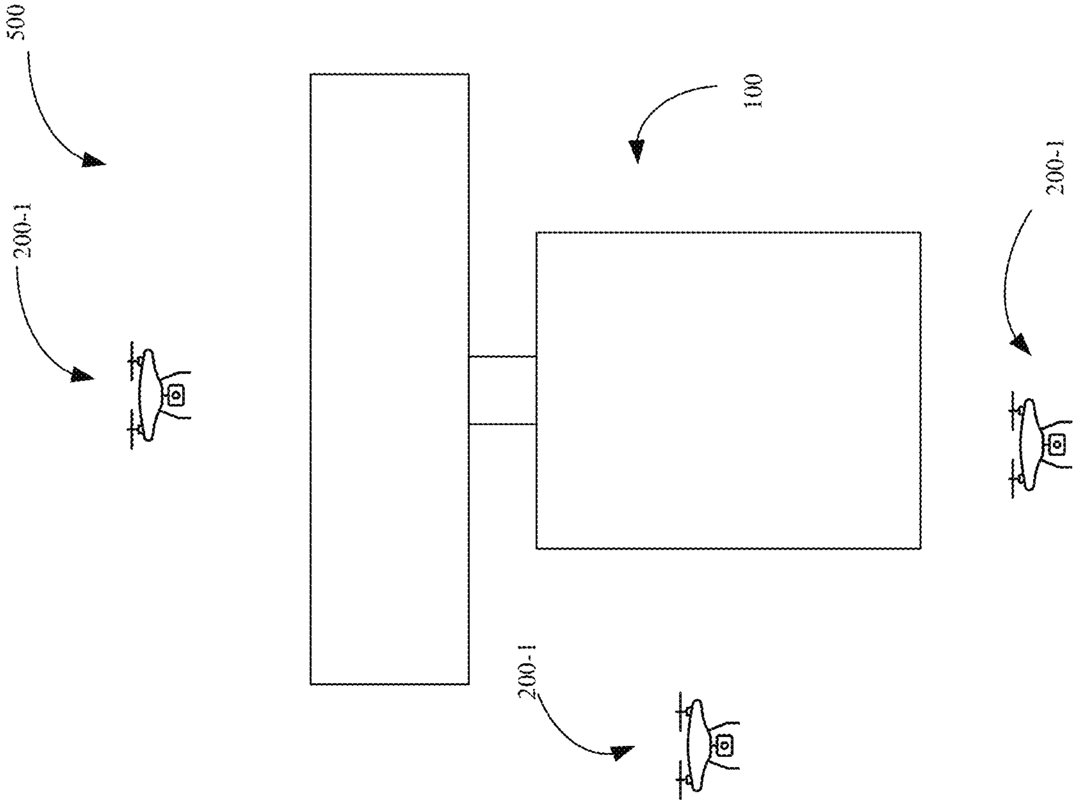

FIGS. 1A and 1B are pictorial illustrations showing an example agricultural harvesting system architecture 500 (hereinafter also referred to as harvesting system 500 or as system 500). System 500, as illustrated in FIGS. 1A and 1B includes a harvester 100 and a plurality of drones 200 (illustratively UAVs 200-1 in FIG. 1A and UGVs 200-2 in FIG. 1B). As shown, the drones 200 can be positioned to detect crop loss at different areas of the worksite relative to the harvester 100. For example, in FIG. 1A, it is shown that UAVs 200-1 are detecting crop loss ahead of the harvester 100 (e.g., pre-harvest crop loss), crop loss in an area extending behind a distal or forward end of the header (e.g., header crop loss), and crop loss behind the harvester 100 (e.g., machine crop loss). In the example shown in FIG. 1B, UGVs 200-2 are detecting crop loss in an area extending behind a distal or forward end of the header (e.g., header crop loss) and crop loss behind the harvester 100 (e.g. machine crop loss). These are merely some examples of system 500. In other examples, system 500 could include more or less drones 200 or could include a combination of one or more UAVs 200-1 and one or more UGVs 200-2.

Figure 2:
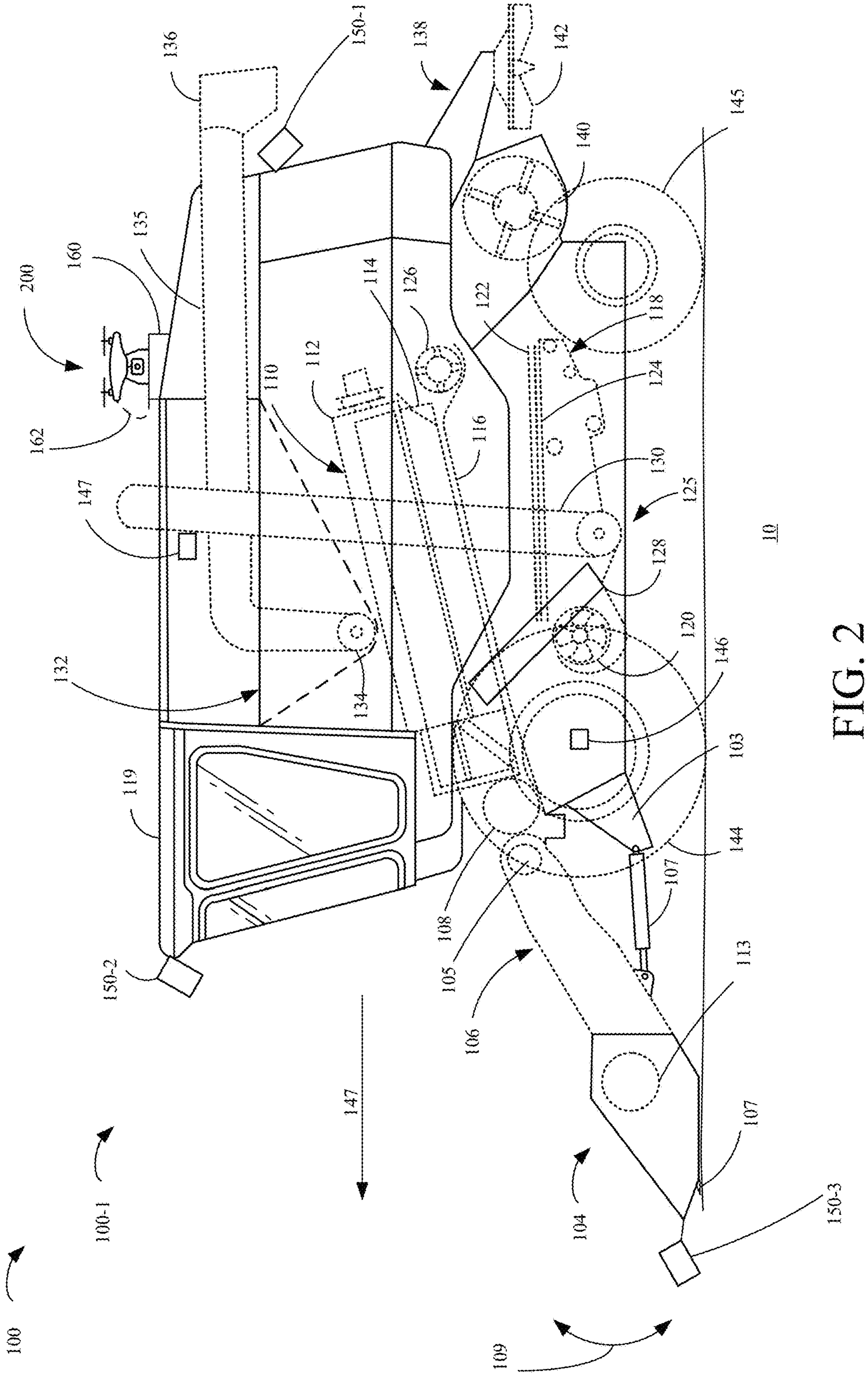
FIG. 2 is a partial pictorial, partial schematic illustration showing an example harvester in the form of a combine harvester.

FIG. 2 is partial pictorial, partial schematic illustration of an example agricultural harvester 100 in the form of a combine harvester 100-1. As illustrated in FIG. 2, combine harvester 100-1 includes ground engaging traction elements (wheels or tracks) 144 and 145 which can be driven by a propulsion subsystem (e.g., internal combustion engine, electric motors, hydrostatic drive, and other drivetrain elements, such as a gear box) to propel combine harvester 100-1 across a worksite 10 (e.g., a field). Combine harvester 100-1 includes an operator compartment or cab 119, which can include a variety of different operator interface mechanisms (e.g., 418 shown in FIG. 5) for controlling combine harvester 100-1 as well as for presenting (e.g., displaying, etc.) various information. Combine harvester 100-1 includes a feeder house 106, a feed accelerator 108, and a thresher generally indicated at 110. The feeder house 106 and the feed accelerator 108 form part of a material handling subsystem 125. Header 104 is pivotally coupled to a frame 103 of combine harvester 100-1 along pivot axis 105. One or more actuators 107 drive movement of header 104 about axis 105 in the direction generally indicated by arrow 109. Thus, a vertical position of header 104 (the header height) above ground 111 over which the header 104 travels is controllable by actuating actuator 107. While not shown in FIG. 2, combine harvester 100-1 can also include one or more actuators that operate to apply a tilt angle, a roll angle, or both to the header 104 or portions of header 104.

Combine harvester 100-1 includes a material handling subsystem 125 that includes a thresher 110 which illustratively includes a threshing rotor 112 and a set of concaves 114. Further, material handling subsystem 125 also includes a separator 116. Combine harvester 100-1 also includes a cleaning subsystem or cleaning shoe (collectively referred to as cleaning subsystem 118) that includes cleaning fan(s) 120, chaffer 122, and sieve 124. The material handling subsystem 125 also includes discharge beater 126, tailings elevator 128, and clean grain elevator 130. The clean grain elevator moves clean grain into a material receptacle (or clean grain tank) 132.

Combine harvester 100-1 also includes a material transfer subsystem that includes a conveying mechanism 134 and a chute 135. Chute 135 includes a spout 136. In some examples, spout 136 can be movably coupled to chute 135 such that spout 136 can be controllably rotated to change the orientation of spout 136. Conveying mechanism 134 can be a variety of different types of conveying mechanisms, such as an auger or blower. Conveying mechanism 134 is in communication with clean grain tank 132 and is driven (e.g., by an actuator, such as motor or engine) to convey material from grain tank 132 through chute 135 and spout 136. Chute 135 is rotatable through a range of positions from a storage position (shown in FIG. 2) to a variety of deployed positions away from combine harvester 100-1 to align spout 136 relative to a material receptacle of a material receiving machine that is configured to receive the material within grain tank 132. One example of such a deployed position is shown in FIG. 1. Spout 136, in some examples, is also rotatable, by an actuator, to adjust the direction of the material stream exiting spout 136.

Combine machine 100-1 also includes a residue subsystem 138 that can include chopper 140 and spreader 142. In some examples, a combine harvester within the scope of the present disclosure can have more than one of any of the subsystems mentioned above. In some examples, combine harvester 100-1 can have left and right cleaning subsystems, separators, etc., which are not shown in FIG. 1.

In operation, and by way of overview, combine harvester 100-1 illustratively moves through a field 10 in the direction indicated by arrow 147. As combine harvester 100-1 moves, header 104 engages the crop plants to be harvested and cuts, with a cutter bar 107 on the header 104, the crop plants to generate cut crop material.

The cut crop material is engaged by a cross auger 113 which conveys the severed crop material to a center of the header 104 where the severed crop material is then moved through an opening to a conveyor in feeder house 106 toward feed accelerator 108, which accelerates the severed crop material into thresher 110. The severed crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural combine harvester 100-1 in a windrow.

Grain falls to cleaning subsystem 118. Chaffer 122 separates some larger pieces of MOG from the grain, and sieve 124 separates some of finer pieces of MOG from the grain. The grain then falls to an auger that moves the grain to an inlet end of grain elevator 130, and the grain elevator 130 moves the grain upwards, depositing the grain in grain tank 132. Residue is removed from the cleaning subsystem 118 by airflow generated by one or more cleaning fans 120. Cleaning fans 120 direct air along an airflow path upwardly through the sieves and chaffers. The airflow carries residue rearwardly in combine harvester 100-1 toward the residue handling subsystem 138.

Tailings elevator 128 returns tailings to thresher 110 where the tailings are re-threshed. Alternatively, the tailings also can be passed to a separate re-threshing mechanism by a tailings elevator or another transport device where the tailings are re-threshed as well.

Combine harvester 100-1 can include a variety of sensors, some of which are illustrated in FIG. 1, such as ground speed sensor 146, one or more mass flow sensors 147, and one or more crop loss sensor systems 150.

Ground speed sensor 146 senses the travel speed of combine harvester 100-1 over the ground. Ground speed sensor 146 can sense the travel speed of the combine harvester 100-1 by sensing the speed of rotation of the ground engaging traction elements 144 or 145, or both, a drive shaft, an axle, or other components. In some instances, the travel speed can be sensed using a positioning system, such as a global positioning system (GPS), a dead reckoning system, a long-range navigation (LORAN) system, a Doppler speed sensor, or a wide variety of other systems or sensors that provide an indication of travel speed. Ground speed sensors 146 can also include direction sensors such as a compass, a magnetometer, a gravimetric sensor, a gyroscope, GPS derivation, to determine the direction of travel in two or three dimensions in combination with the speed. This way, when combine harvester 100-1 is on a slope, the orientation of combine harvester 100-1 relative to the slope is known. For example, an orientation of combine harvester 100-1 could include ascending, descending or transversely travelling the slope.

Mass flow sensors 147 sense the mass flow of material (e.g., grain) through clean grain elevator 130. Mass flow sensors 147 can be disposed at various locations, such as within or at the outlet of clean grain elevator 130. In some examples, the mass flow rate of material sensed by mass flow sensors 147 is used in the calculation of yield as well as in the calculation of the fill level of the on-board material tank 132. In some examples, mass flow sensors 147 include an impact (or strike) plate that is impacted by material (e.g., grain) conveyed by clean grain elevator 130 and a force or load sensor that detects the force or load of impact of the material on the impact (or strike) plate. This is merely one example of a mass flow sensor.

Crop loss sensor systems 150 can include one or more of a variety of sensors, such as cameras (e.g., mono cameras, stereo cameras, color (e.g. RGB) cameras, multispectral cameras, thermal camera, infrared cameras, near-infrared cameras, etc.), lidar sensors, radar sensors, terahertz sensors, as well as various other sensor configured to emit and/or receive electromagnetic radiation, ultrasonic sensors, as well as a variety of other sensors. Crop loss sensor systems 150 can illustratively detect crop loss at the worksite 10. While FIG. 2 shows some example positions of a crop loss sensor system 150, it will be understood that crop loss sensor systems 150 can, alternatively or additionally, be positioned (or otherwise disposed) at a variety of other locations on combine harvester 100-1. As shown, a crop loss sensor system 150 (illustratively 150-1) can be positioned to detect behind the combine harvester 100-1, such as to detect harvesting crop loss (e.g., machine crop loss). Additionally, as shown, a crop loss sensor system 150 (illustratively 150-2) can be positioned to detect behind a forward or distal end of the header 104 to detect harvesting crop loss (e.g., header crop loss) or to detect ahead of the header 104 to detect pre-harvest crop loss, or both. Additionally, as shown, a crop less sensor system 150 (illustratively 150-3) can be mounted or otherwise coupled to the header 104 to detect ahead of the header 104 to detect pre-harvest crop loss. For example, the sensor system 150-3 could be mounted or otherwise coupled to various components of a header 104, such as, but not limited to, the cutterbar, end dividers, points, reel arms, or other components. Additionally, sensor system 150-3 could be oriented to look ahead of the header 104 by observing in a direction away from the header 104 or could be orientated to look ahead of the header by observing in a direction towards the header 104 (e.g., could be positioned out in front of the header 104 and orientated to look back towards the header 104 and the ground in front of the header 104).

A harvester 100 can include various other sensors, some of which will be described in FIG. 5.

As further illustrated in FIG. 2, a harvester 100 can include a docking station 160 configured to dock a drone (illustratively UAV 200-1) and, optionally, a tether 162 coupling the harvester 100 and the drone 200. The tether 162 can include communication circuitry that provides for communication between harvester 100 and drone 200 and power circuitry that provides for power to the drone 200. Tether 162 can be any of a variety of lengths. In some examples, a tether 162 is not included and, instead, the docking station 160 includes power circuitry that provides power to the drone 200. While FIG. 2 shows a docking station docking a UAV 200-1, it will be understood that in other examples, a harvester 100 can include a docking station configured to dock another type of drone 200, such as a UGV 200-2, which can be tethered to or untethered from harvester 100.

A harvester 100 can include various other items, some of which will be described in FIG. 5.

Figure 3:
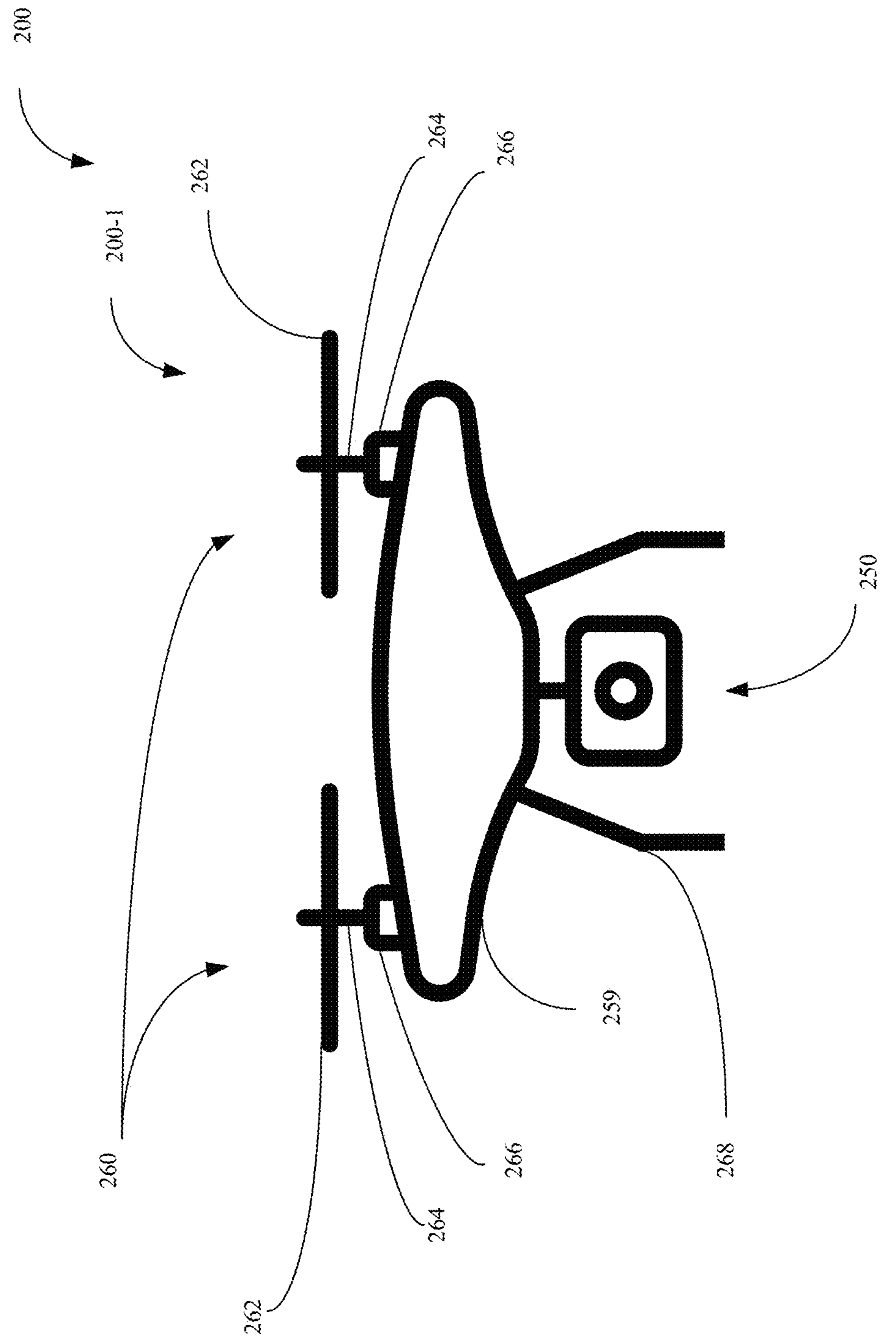
FIG. 3 is a pictorial illustration showing an example unmanned aerial vehicle (UAV).

FIG. 3 is a pictorial illustration showing one example UAV 200-1. As illustrated in FIG. 3, UAV 200-1 includes crop loss sensor system 250, body 259, propeller systems 260, and landing gear 268. Each propeller systems 260 includes a plurality of propeller blades 262, a rotor 264, and a motor 266. In the illustrated example, UAV 200-1 is a quadcopter (i.e., in the illustrated example, UAV 200-1 includes four propeller systems 260). Though, in other examples, UAV 200-1 could include a different number of propeller systems 260. It will be understood by those skilled in the art, that the each of the motors 266 can be individually controlled, and that the speed and, in some examples, the direction of rotation of the motors 266 is adjustable to controllably move and position the UAV 200-1. Crop loss sensor system 250 can include one or more sensors that detect crop loss at a worksite. Crop loss sensor system 250 can include one or more of a variety of sensors, such as cameras (e.g., mono cameras, stereo cameras, color (e.g. RGB) cameras, multispectral cameras, thermal cameras, infrared cameras, near-infrared cameras, etc.), lidar sensors, radar sensors, terahertz sensors, as well as various other sensors configured to emit and/or receive electromagnetic radiation, ultrasonic sensors, as well as a variety of other sensors. UAV 200-1 can include various other sensors, some of which will be described in FIG. 5.

UAV 200-1 can include various other items, some of which will be described in FIG. 5.

Figure 4:
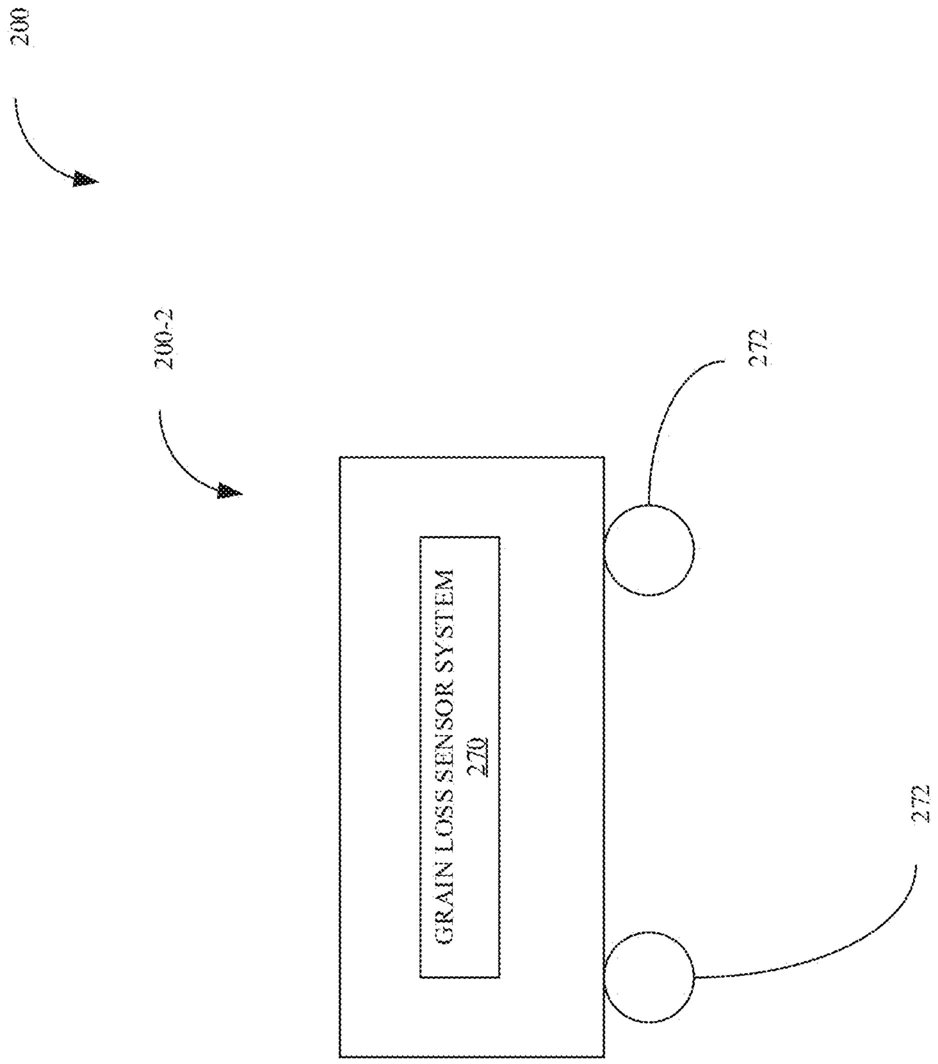
FIG. 4 is a partial pictorial illustration, partial block diagram showing an example unmanned ground vehicle (UGV).

FIG. 4 is a partial pictorial illustration, partial block diagram showing one example UGV 200-2. As illustrated in FIG. 4, UGV 200-2 includes a crop loss sensor system 270 and ground engaging traction elements 272. The ground engaging traction elements (illustratively wheels, though in other examples could be tracks) support the UGV over the surface over the worksite and are controllably moveable to propel and steer the UGV 200-2, such as by a travel subsystem (described in FIG. 5) which can include one or more actuators (e.g., motors, etc.) for driving the elements 272 and one or more actuators (e.g., cylinders, linear actuators, etc.) for turning the elements 272. Crop loss sensor system 270 can include one or more sensors that detect crop loss at a worksite. Crop loss sensor system 270 can include one or more of a variety of sensors, such as cameras (e.g., mono cameras, stereo cameras, color (e.g. RGB) cameras, multispectral cameras, thermal cameras, infrared cameras, near-infrared cameras, etc.), lidar sensors, radar sensors, terahertz sensors, as well as various other sensors configured to emit and/or receive electromagnetic radiation, ultrasonic sensors, as well as a variety of other sensors. UGV 200-2 can include various other sensors, some of which will be described in FIG. 5.

UGV 200-2 can include various other items, some of which will be described in FIG. 5.

Figure 5A:
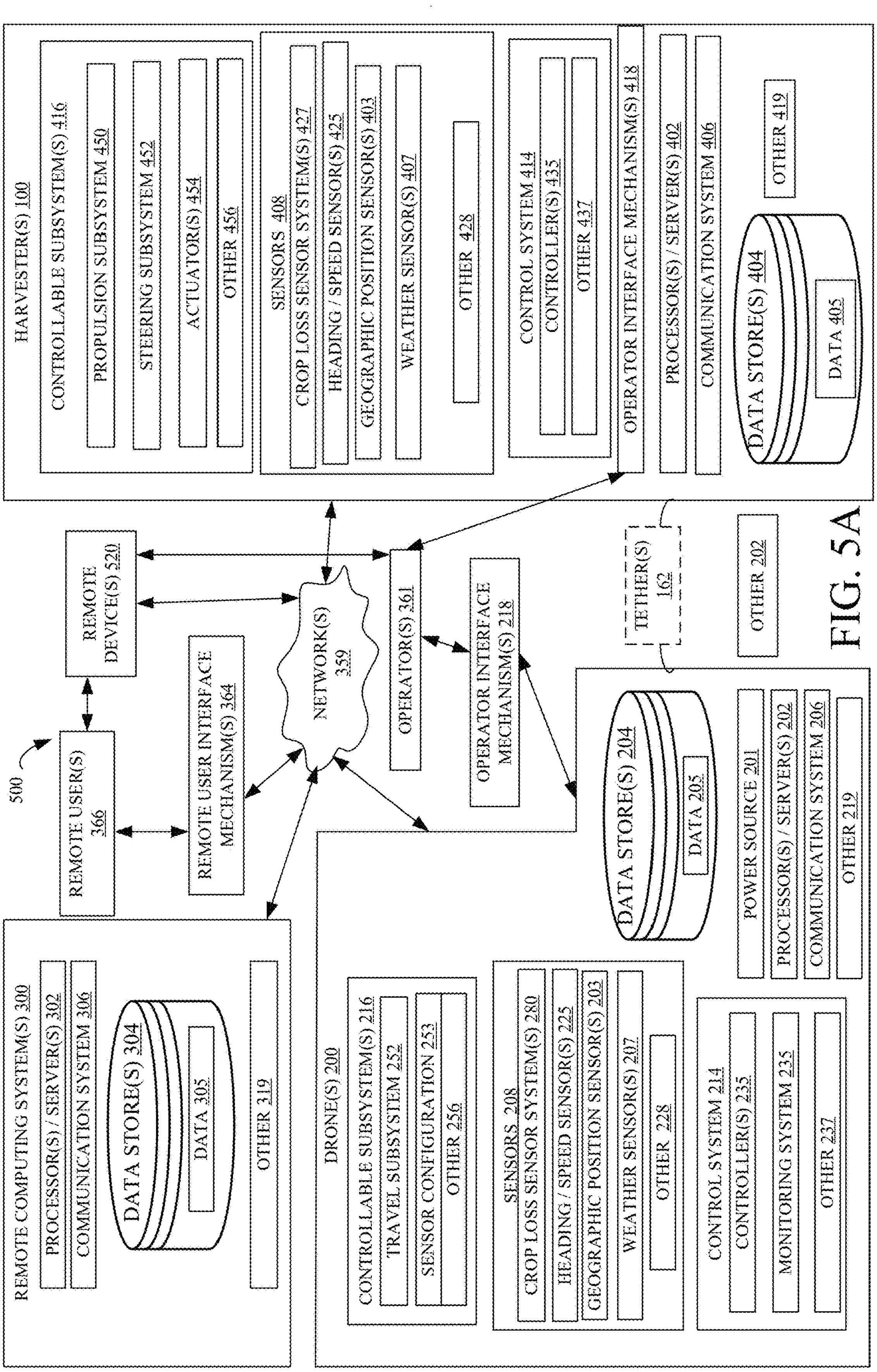
FIGS. 5A and 5B (collectively referred to herein as FIG. 5) show a block diagram of one example agricultural harvesting system architecture.
Figure 5B:
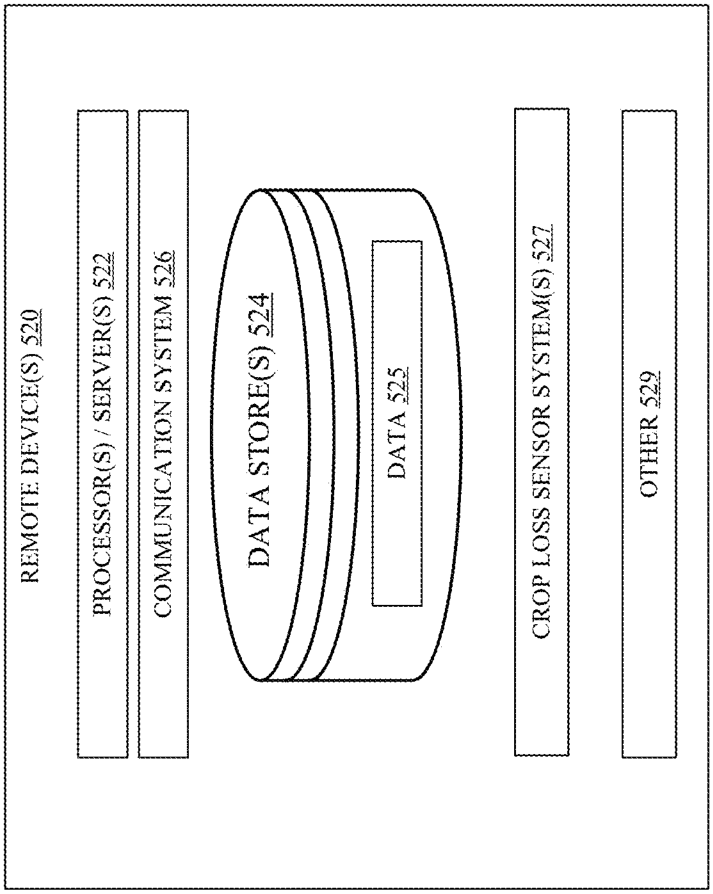

FIGS. 5A and 5B (collectively referred to herein as FIG. 5) show a block diagram showing one example agricultural harvesting system architecture 500 (hereinafter also referred to as harvesting system 500 or as system 500). System 500 includes one or more agricultural harvesters 100 and one or more drones 200 (e.g., one or more UAVs 200-1 or one or more UGVs 200-2, or both). System 500 also includes one or more remote computing systems 300, one or more networks 359, one or more remote user interface mechanisms 364, one or more remote devices 520, and can include a variety of other items 202 as well. As illustrated, system 500 can, optionally, include one or more tethers 162, each tether 162 tethering a harvester 100 to a drone 200.

Each harvester 100, itself, illustratively includes one or more processors or servers 402, one or more data stores 404, communication system 406, one or more sensors 408, control system 414, one or more controllable subsystems 416, one or more operator interface mechanisms 418, and can include various other items and functionality 419 as well.

Each drone 200, itself, illustratively includes one or more processors or servers 202, one or more data stores 204, communication system 206, one or more sensors 208, control system 214, one or more controllable subsystems 216, one or more operator interface mechanisms 218, and can include various other items and functionality 219 as well.

Each remote device 520, itself, includes one or more processors or servers 522, one or more data stores 524, communication system 526, crop loss sensor systems 527, and can include various other items and functionality 529. Remote devices 520 can include one or more of a variety of remote devices, such as handheld mobile devices (e.g., tablets, smartphones, etc.) that can be carried by a user or operator, or a device stationed at the worksite.

Remote computing systems 300, as illustrated, include one or more processors or servers 302, one or more data stores 304, communication system 306, and can include various other items and functionality 319.

Data stores 204, data stores 304, data stores 404, and data stores 524 each store a variety of data (generally indicated as data 205, data 305, data 405, and data 525 respectively), some of which will be described in more detail herein. For example, data 205, data 305, data 405, or data 525, or a combination thereof, can include, among other things, sensor data, operation data, machine data, worksite data, priority data, monitoring selection data, threshold data, as well as various other data. Some examples of the various data will be described in more detail in FIG. 6. Additionally, data 205 can include computer executable instructions that are executable by one or more processors or servers 202 to implement other items or functionalities of system 500, including other items or functionalities of drones 200. Additionally, data 305 can include computer executable instructions that are executable by one or more processors or servers 302 to implement other items or functionalities of system 500, including other items of remote computing systems 300. Additionally, data 405 can include computer executable instructions that are executable by one or more processors or servers 402 to implement other items or functionalities of system 500, including other items or functionalities of harvesters 100. Additionally, data 525 can include computer executable instructions that are executable by one or more processors or servers 522 to implement other items or functionalities of system 500, including other items or functionalities of remote devices 520. It will be understood that data stores 204, data stores 304, data stores 404, and data stores 524 can include different forms of data stores, for instance both volatile data stores (e.g., Random Access Memory (RAM)) and non-volatile data stores (e.g., Read Only Memory (ROM), hard drives, solid state drives, etc.).

Sensors 408 can include one or crop loss sensor systems 427, one or more heading/speed sensors 425, one or more geographic position sensors 403, one or more weather sensors 407, and can include various other sensors 428 as well. The sensor data generated by sensors 408 can be communicated to remote computing systems 300, to drones 200, to other harvesters 100, and to other items of a harvester 100. Control system 414, itself, can include one or more controllers 435 for controlling various other items of harvester 100, and can include other items 437 as well. Controllable subsystems 416 can include propulsion subsystem 450, steering subsystem 452, actuators 454, and can include various other subsystems 456 as well.

Sensors 208 can include one or more crop loss sensor systems 280, one or more heading/speed sensors 225, one or more geographic position sensors 203, one or more weather sensors 207, and can include various other sensors 228 as well. The sensor data generated by sensors 208 can be communicated to remote computing systems 300, to harvesters 100, to other drones 200, and to other items of a drone 200. Control system 214, itself, can include one or more controllers 235 for controlling various other items of a drone 200, crop loss monitoring system 235, and can include other items 237 as well. Controllable subsystems 216 can include travel subsystem 252, sensor configuration subsystem 253, and can include various other subsystems 256 as well.

Heading/speed sensors 425 detect a heading characteristic (e.g., travel direction) or speed characteristic (e.g., travel speed, acceleration, deceleration, etc.), or both, of an agricultural harvester 100. This can include sensors that sense the movement (e.g., rotation) of ground-engaging elements (e.g., wheels or tracks) or movement of components coupled to the ground engaging elements (e.g., axles) or other elements, or can utilize signals received from other sources, such as geographic position sensors 403. Thus, while heading/speed sensors 425 as described herein are shown as separate from geographic position sensors 403, in some examples, machine heading/speed is derived from signals received from geographic position sensors 403 and subsequent processing. In other examples, heading/speed sensors 425 are separate sensors and do not utilize signals received from other sources.

Heading/speed sensors 225 detect a heading characteristic (e.g., travel direction) or speed characteristic (e.g., travel speed, acceleration, deceleration, etc.), or both, of a drone 200. In the case of UAVs 200-1, this can include sensors that sense movement (e.g., rotation) of components (e.g., 266, 264, or 262) of the UAV 200-1, sensors that sense movement of the UAV 200-1 (e.g., accelerometers, etc.), or can utilize signals received from other sources, such as geographic position sensors 203. In the case of UGVs 200-2, this can include sensors that sense the movement (e.g., rotation) of ground-engaging elements (e.g., wheels or tracks) or movement of components coupled to the ground engaging elements (e.g., axles) or other elements, or can utilize signals received from other sources, such as geographic position sensors 203. Thus, while heading/speed sensors 225 as described herein are shown as separate from geographic position sensors 203, in some examples, machine heading/speed is derived from signals received from geographic position sensors 203 and subsequent processing. In other examples, heading/speed sensors 225 are separate sensors and do not utilize signals received from other sources.

Geographic position sensors 403 illustratively sense or detect the geographic position or location of a harvester 100. Geographic position sensors 203 illustratively sense or detect the geographic position or location of a drone 200. Geographic position sensors 403 and 203 can include, but are not limited to, a global navigation satellite system (GNSS) receiver that receives signals from a GNSS satellite transmitter. Geographic position sensors 403 and 203 can also include a real-time kinematic (RTK) component that is configured to enhance the precision of position data derived from the GNSS signal. Geographic position sensors 403 and

203 can include a dead reckoning system, a cellular triangulation system, or any of a variety of other geographic position sensors.

Weather sensors 207 and 407 illustratively sense or detect various weather attributes relative to the worksite. Weather sensors 207 and 407 can include temperature sensors, humidity sensors, dewpoint sensors, wind sensors (detect wind speed and direction), light sensors (detect characteristics of ambient light, such as the intensity or amount of ambient light, the inclination angle of ambient light, etc.), precipitation sensors (detect precipitation type and amount), odor sensors (detect ambient odors), ambient airborne debris sensors, cloud coverage sensors, as well as various other sensors. It will be noted that, in some examples, at least some weather characteristics can be obtained from sources other than weather sensors, such as from publicly available third-party weather sources (e.g., Internet-based sources), via a communication system (e.g., 206, 306, or 406) over networks 359.

Crop loss sensor systems 280, crop loss sensor systems 427, and crop loss sensor systems 527, detect crop loss at the worksite. In one example, crop loss sensor systems 280 are similar to crop loss sensor systems 250 or crop loss sensor systems 270, or can be other types of crop loss sensor systems. In one example, crop loss sensor systems 427 are similar to crop loss sensor systems 150 or can be other types of crop loss sensor systems. In one example, crop loss sensor systems 527 can include one or more of a variety of sensors, such as cameras (e.g., mono cameras, stereo cameras, color (e.g. RGB) cameras, multispectral cameras, thermal cameras, infrared cameras, near-infrared cameras, etc.), lidar sensors, radar sensors, terahertz sensors, as well as various other sensors configured to emit and/or receive electromagnetic radiation, ultrasonic sensors, as well as a variety of other sensors.

Crop loss detection can include detecting crop on the ground, crop remaining on the plant, crop intermixed with other items, or crop outside of the harvester (e.g., being tossed from the header, etc.). In some examples, detecting crop loss can include detecting individual kernels or grains or collections of kernels or grains (e.g., an ear, a pod, a head, etc.), and detecting indications, on the crop plants, of crop loss (e.g., damage to the crop plants indicating loss of crop, such as indications of crop collections having broken off from the crop plant). For example, in the category of pre-harvest loss, detection generally includes detecting crop on the ground in front of the harvester. In the sub-category of header crop loss, detection generally includes detecting crop missed by the header (e.g., unsevered crop plants, crop still remaining on crop plants in an area extending behind the forward or distal end of the header, etc.), crop dropped by the header, crop leaked from the header, crop tossed/thrown from the header, as well as crop on the ground in an area extending behind the forward or distal end of the header. In the sub-category of machine crop loss, detecting generally includes detecting crop on the ground and crop intermixed with material other than grain (MOG) or residue expelled from the harvester.

Sensors 408 can also include various other types of sensors 428. Sensors 208 can also include various other types of sensors 228. Some example of other types of sensors (e.g., 428 or 228, or both) are sensors (e.g., cameras, lidar, radar, ultrasound, etc.), that detect obstructions (e.g., debris clouds, etc.) at the worksite. In some examples, the sensor(s) of crop loss sensor system 427 or the sensor(s) of crop loss sensor system 280, or both, can be utilized to detect obstructions (e.g., debris clouds, etc.) at the worksite. In other examples, sensors separate from crop loss sensor system 280 and separate from crop loss sensor system 427 are used to detect obstructions at the worksite.

Control system 414 can include one or more controllers 435 (e.g., electronic control units, which can include or be implemented by one or more processors, such as one or more processors 402) that generate control signals to control one or more components of a harvester 100 or components of system 500, or both. For example, but not by limitation, controllers 435 can include, a communication system controller to control communication system 406, an interface controller to control one or more interface mechanisms (e.g., 418 or 364, or both), a propulsion controller to control propulsion subsystem 450 to control a travel speed of a harvester 100, a path planning controller to control steering subsystem 452 to control a route or heading of a harvester 100, and one or more actuator controllers to control operation of actuators 454 of a harvester 100. In other examples, a central controller 435 can be used to generate control signals to control a plurality of the controllable subsystems 416 as well, in some examples, other items of system 500. Control system 214 can include a variety of controllers 235 (e.g., electronic control units, which can include or be implemented by one or more processors, such as one or more processors 202) that generate control signals to control one or more components of a drone 200 or components of system 500, or both. For example, but not by limitation, controllers 235 can include a communication system controller to control communication system 206, an interface controller to control one or more interface mechanisms (e.g., 218 or 364, or both), a travel controller to control travel subsystem 252 to control a travel speed, travel direction, and location of a drone 200, a sensor configuration controller to control sensor configuration subsystem 253 to activate or deactivate one or more sensors 208. In other examples, a central controller 235 can be used to generate control signals to control a plurality of the controllable subsystems 216 as well, in some examples, other items of system 500.

Propulsion subsystem 450 includes one or more controllable actuators (e.g., internal combustion engine, motors, pumps, gear boxes, etc.) that drive the ground engaging traction elements (e.g., wheels or tracks) of a harvester 100.

Steering subsystem 452 includes one or more controllable actuators (e.g., electric actuators, hydraulic actuators, etc.) that are controllably actuatable to control the steering and thus heading of a harvester 100.

Travel subsystem 252 includes one or more controllable actuators operable to drive movement of drones 200 to control travel speed, travel direction, and positioning of the drones 200. In the example of UAVs 200-1, travel subsystem 252 includes one or more controllable actuators (e.g., motors 266) that drive movement of the propeller systems 260 to move and position a UAV 200-1. It will be understood that the speed or direction of rotation, or both, of the motors 266, and thus the propeller systems, can be controlled. Additionally, each motor 266 can be individually controlled, though, in some examples, sub-sets of the motors 266 (e.g., pairs, etc.) are controlled similarly. It will be understood that travel subsystem 252 is controllable to control the travel speed, travel direction, and position of a UAV 200-1. In the example of UGVs 200-2, travel subsystem 252 includes one or more controllable actuators (e.g., motors, etc.) that drive the ground engaging traction elements 272 of a UGV 200-2 and further includes one or more controllable actuators (e.g., electric actuator, hydraulic actuators, etc.) that are controllably actuatable to control the steering and thus heading of a UGV 200-2. It will be understood that travel subsystem

252 is controllable to control the travel speed, travel direction, and position of a UGV 200-2.

Actuators 454 include a variety of different types of actuators that control operating parameters of one or more components of a harvester 100. Actuators 454 can include actuators that control the position or orientation of components of a harvester 100 as well as actuators that control a speed of components of a harvester 100. Actuators 454 can include, without limitation, motors, valves, pumps, hydraulic actuators (e.g., hydraulic cylinders, etc.), pneumatic actuators (e.g., pneumatic cylinders, etc.), electric actuators (e.g., linear actuators, etc.), as well as various other types of actuators.

In the example of combine harvester 100-1, actuators 454 can include actuators controllable to control operating parameters of one or more of the components described in FIG. 2. For example, actuators 454, in the example of combine 100-1, can include actuators for controlling the orientation (height, pitch, roll) of header 104 and actuators for controlling speed or position of components of header 104. Additionally, in the example of combine harvester 100-1, actuators 454 can include actuators for controlling speed or position of components of material handling subsystem 125, cleaning subsystem 118, material transfer subsystem, residue subsystem 138, as well as various other actuators.

FIG. 5 also shows that control system 214 can include crop loss monitoring system 235. Crop loss monitoring system 235 plans and controls the crop loss monitoring performed by drones 200 at the worksite. Monitoring system 235 will be discussed in more detail in FIG. 6.

Communication system 406 is used to communicate between components of a harvester 100 or with other items of system 500, such as remote computing systems 300, drones 200, other harvesters 100, or user interface mechanisms 364, or a combination thereof. Communication system 206 is used to communicate between components of a drone 200 or with other items of system 500, such as remote computing systems 300, harvesters 100, other drones 200, or user interface mechanisms 364, or a combination thereof. Communication system 306 is used to communicate between components of a remote computing system 300 or with other items of system 500, such as harvesters 100, drones 200, other remote computing systems 300, or user interface mechanisms 364, or a combination thereof. Communication system 526 is used to communicated between components of a remote device 520 or with other items of system 500, such as remote computing systems 300, drones 200, harvesters 100, user interface mechanisms 364, other remote devices 520, or a combination thereof.

Communication systems 206, 306, 406, and 526 can each include one or more of wired communication circuitry and wireless communication circuitry, as well as wired and wireless communication components. In some examples, communication systems 206, 306, 406, and 526 can each be a system for communicating over the Internet, a system for communicating over a cellular network, a system for communicating over a wide area network or a local area network, a system for communicating over a controller area network (CAN), such as a CAN bus, a system for communicating over a controller area network flexible data-rate (CAN FD), such as CAN FD bus, a system for communicating over a near field communication network, a system for communicating over ethernet, or a communication system configured to communicate over any of a variety of other networks. Communication systems 206, 306, and 406 can each also include a system that facilitates downloads or transfers of information to and from a secure digital (SD) card or a universal serial bus (USB) card, or both. Communication systems 206, 306, and 406 can each utilize network 359. Networks 359 can be any of a wide variety of different types of networks such as the Internet, a cellular network, a wide area network (WAN), a local area network (LAN), a controller area network (CAN), a controller area network flexible data-rate (CAN FD), a near-field communication network, ethernet, or any of a wide variety of other networks.

FIG. 5 shows that one or more operators 361 can operate harvesters 100 and drones 200 and, in some examples, remote devices 520 (e.g., handheld remote devices, etc.). The operators 361 interact with operator interface mechanisms 418 or operator interface mechanisms 218. In some examples, operator interface mechanisms 418 and operator interface mechanisms 218 can each include joysticks, levers, a steering wheel, linkages, pedals, buttons, wireless devices (e.g., mobile computing devices, etc.), dials, keypads, a display device (including a display screen), user actuatable elements (such as icons, buttons, etc.) on a display device, a microphone and speaker (where speech recognition and speech synthesis are provided), among a wide variety of other types of control devices. Where a touch sensitive display system is provided, the operators 361 can interact with operator interface mechanisms 418 and operator interface mechanisms 218 using touch gestures. Additionally, at least some of the operator interface mechanisms 418 and operator interface mechanisms 218 can be used to present (e.g., display, audible presentation, haptic presentation, etc.) various information. The examples described above are provided as illustrative examples and are not intended to limit the scope of the present disclosure. Consequently, other types of operator interface mechanisms 418 and operator interface mechanisms 218 can be used and are within the scope of the present disclosure.

Additionally, as shown in FIG. 5, operator interface mechanisms 218 can be separate from, but communicatively coupled to, drones 200. In some examples, operator interface mechanisms 218 are a part of or included as functionality of operator interface mechanisms 418.

FIG. 5 also shows remote users 366 interacting with harvesters 100, drones 200, remote computing systems 300, and remote devices 520 through user interface mechanisms 364 over networks 359. In some examples, user interface mechanisms 364 can include joysticks, levers, a steering wheel, linkages, pedals, buttons, wireless devices (e.g., mobile computing devices, etc.), dials, keypads, a display device (including a display screen), user actuatable elements (such as icons, buttons, etc.) on a display device, a microphone and speaker (where speech recognition and speech synthesis are provided), among a wide variety of other types of control devices. Where a touch sensitive display system is provided, the users 366 can interact with user interface mechanisms 364 using touch gestures. Additionally, at least some of the user interface mechanisms 364 can be used to present (e.g., display, audible presentation, haptic presentation, etc.) various information. The examples described above are provided as illustrative examples and are not intended to limit the scope of the present disclosure. Consequently, other types of user interface mechanisms 364 can be used and are within the scope of the present disclosure.

Remote computing systems 300 can be a wide variety of different types of systems, or combinations thereof. For example, remote computing systems 300 can be in a remote server environment. Further, remote computing systems 300 can be remote computing systems, such as mobile devices, a remote network, a farm manager system, a vendor system, or a wide variety of other remote systems. In one example, harvesters 100 can be controlled remotely by remote computing systems 300 or by remote users 366, or both. In one example, UAVs 200 can be controlled remotely by remote computing systems 300 or by remote users 366, or both. In some examples, operators 361 are on-board (e.g., in an operator compartment, such as a cab) the harvesters 100. In some examples, operators 361 are remote from the machines (e.g., 100 or 200) and control the machines through one or more interface mechanisms (e.g. one or more of 418 and one or more of 218) which are remote from the machines but operatively coupled (e.g., communicatively coupled, such as over networks 359) to the machines.

It will be understood that, in some examples, items in system 500 can be distributed in various ways, including ways that differ from the example shown in FIG. 5. For example, but not by limitation, crop loss monitoring system 235, shown in FIG. 5 as being disposed on drones 200, can be located elsewhere, such as at one or more harvesters 100, at one or more remote computing systems 300, or at one or more remote devices 520. In yet other examples, crop loss monitoring system 235 can be distributed across one or more of a drone 200, a harvester 100, a remote computing system 300, or a remote device 520. Thus, it will be understood that crop loss monitoring system 235 can be distributed across system 500 in various ways.

Figure 6:
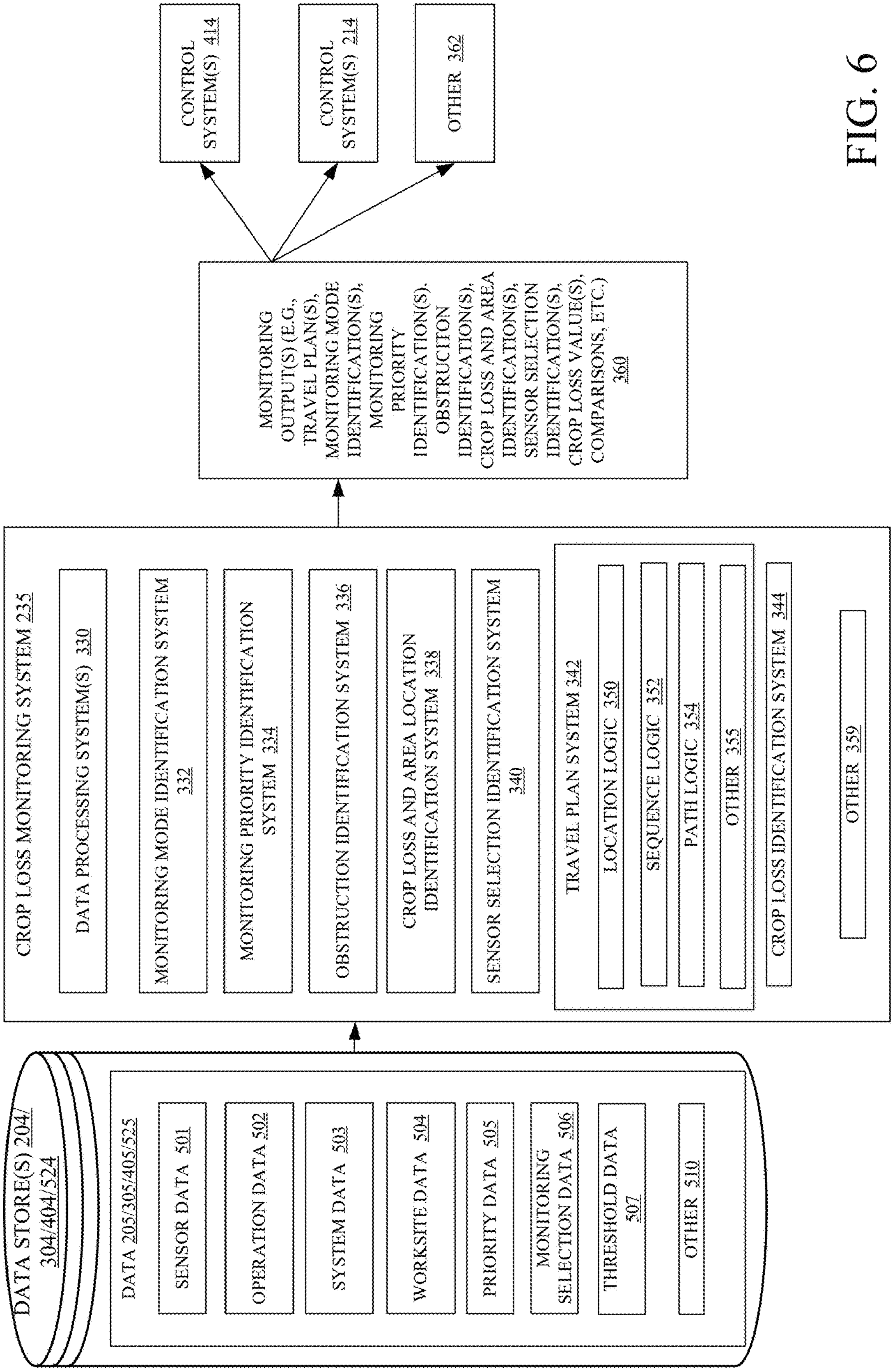
FIG. 6 is a block diagram showing some examples of components of the agricultural harvesting system architecture, including crop loss monitoring system, in more detail.

FIG. 6 is a block diagram that shows examples of some of the components of system 500 in more detail and information flow between the components.

As illustrated in FIG. 6, it can be seen that data stores 204, data stores 304, data stores 404, or data stores 524, or a combination thereof, can include as data (205, 305, 405, and 525, respectively), sensor data 501, operation data 502, system data 503, worksite data 504, priority data 505, monitoring selection data 506, threshold data 507, and can include various other data 510, including, but not limited to, other data described elsewhere herein. In some examples, where the data is located can depend on where crop loss monitoring system 235 (also called system 235) is located.

As shown in FIG. 6, crop loss monitoring system 235 includes one or more data processing systems 330, monitoring mode identification system 332, monitoring priority identification system 334, obstruction identification system 336, crop loss and area location identification system 338, sensor selection identification system 340, travel plan system 342, crop loss identification system 344, comparison logic 346, as well as various other items and functionality 359. Travel plan system 342, itself, includes location logic 350, sequence logic 352, path logic 354, and various other items 354. As will be described in more detail, system 235 is operable to generate one or more monitoring outputs 360.

Sensor data 501 includes sensor data (e.g., images, sensor signals, etc.) generated by sensors 208, sensors 408, and sensors 527. Sensor data 501 can thus include, crop loss sensor data generated by crop loss sensor systems 280, crop loss sensor systems 427, and crop loss sensor systems 527, weather sensor data generated by weather sensors 207 and weather sensors 407, geographic position sensor data generated by geographic position sensors 203 and geographic position sensors 403, heading/speed sensor data generated by heading/speed sensors 225 and heading/speed sensors 425, as well as various other sensor data generated by other sensors 228 and other sensors 428, such as obstruction sensor data.

Operation data 502 includes data indicative of one or more characteristics of the operation being performed by the one or more harvesters 100. For example, operation data 502 can include data that indicates planned/prescribed machine operating parameters, such as planned/prescribed machine settings, planned/prescribed machine travel path (route), as well as other operating parameters. Further, operation data 502 can include data that indicates the number and identity of machines to perform/performing the operation. Operation data 502 can be derived from a variety of sources including, but not limited to, operator or user input, sensor data, as well as a variety of other sources.

System data 503 includes data indicative of one or more characteristics of the components of system 500, such as machine characteristics of the harvesters 100 that are to perform (or are performing) the operation at the worksite, machine characteristics of the drones that are to perform (or are performing) in the operation at the worksite, as well as characteristics of other items of system 500. System data 503 can include data indicative of the type of harvesters (e.g. model, etc.), data indicative of the dimensions of the harvesters 100, data indicative of locations of components of the harvesters 100, machine configuration (e.g., type and characteristics of attachments/implements of the harvesters, such as the headers), data indicative of controllable subsystem latency of controllable subsystems 416 of the harvesters 100, as well as various other machine characteristics relative to the harvesters 100. System data 503 can include data indicative of the type of drones (e.g., model, etc.), data indicative of the dimensions of the drones, data indicative of locations of components of the drones 200, data indicative of controllable subsystem latency of controllable subsystems 216 of the drones 200, as well as various other machine characteristics relative to the drones. System data 503 can include data indicative of sensor data latency (e.g., sensor (e.g., 208, 408, 527) latency and data processing system 330 latency). System data 503 can be derived from a variety of sources including, but not limited to, dealer or manufacturer provided information, operator or user input, stored machine identifying information, as well as from a variety of other sources.

Worksite data 504 includes data of indicative of attributes of the worksite which is derived from sources other than sensors 208 and 408 or can be derived from sensors 208 and 408 during past (historical) operations. For example, some worksite data can be obtained from other sources, such as third-party providers, maps, historical data, operator or user input, as well as other sources. For instance, maps of the worksite, such as from overhead imagery or historical operations, can provide worksite data. In another example, third-party providers can provide worksite data. For instance, a third-party weather information provider can provide worksite data indicative of weather attributes at the worksite. Additionally, operators or users can provide, by input, various attribute information. Further, some worksite can be obtained from historical data (e.g., data collected during prior operations). Some examples of attributes indicated by worksite data include topographical attributes (e.g., elevation, slope, surface profile, etc.), crop attributes (e.g., crop type, crop row spacing and direction, crop height, etc.), soil attributes (e.g., soil moisture, soil type, etc.), obstruction attributes (e.g., indicative of location and types of obstructions at worksite), worksite boundary attributes (e.g., location of worksite boundaries, worksite size, headland location and size, etc.), as well as various other worksite attributes.

Priority data 505 includes data indicative of a priority of crop loss to be monitored. Priority data 505 can include a hierarchy of crop loss, such as a ranked list of crop loss (e.g., relative priority of pre-harvest crop loss and harvesting crop loss or relative priority of pre-harvest crop loss, header crop loss, and machine crop loss). Priority data 505 can be derived from operator or user inputs, can be system defaults, such as defaults based on the type of harvesting, the type of harvester, the type of crop, or can be derived from learning functionality.

Monitoring selection data 506 includes data indicative of a selection of crop loss to be monitored or a selection of a monitoring mode. For example, a monitoring selection can indicate that total crop loss is to be monitored (e.g., both pre-harvest crop loss and harvesting crop loss are to be monitored). In another example, a monitoring selection can indicate that only pre-harvest crop loss is to be monitored. In another example, a monitoring selection can indicate that only harvesting crop loss is to be monitored. In another example, a monitoring selection can indicate that a combination of pre-harvest crop loss and a category of harvesting loss (e.g., one of header crop loss or machine crop loss) are to be monitored. Monitoring selection data 506 can be derived from operator or user inputs, can be system defaults, such as defaults based on the type of operation or the type of machine, or can be derived from learning functionality.

Threshold data 507 includes data indicative of crop loss thresholds, such as a total crop loss threshold, a pre-harvest crop loss threshold, a harvesting crop loss threshold, a header crop loss threshold, or a machine crop loss threshold. Threshold data 507 can be derived from various sources such as operator or user inputs, expert knowledge, manufacturer provided information, learning functionality, as well as various other sources.

Data processing systems process sensor data 501, operation data 502, system data 503, worksite data 504, priority data 505, monitoring selection data 506, threshold data 507, and other data 510 to generate processed data. The processed data can include computer readable values, useable (or readable) by other items of crop loss monitoring system 235. Data processing system can include various processing functionality, including image processing functionality, sensor signal processing functionality, filtering functionality, categorization functionality, normalization functionality, aggregation functionality, color extraction functionality, analog-to-digital conversion functionality, other conversion functionality (e.g., look up tables, equations, mathematical functions, models, etc.), as well as various other data processing functionalities. It will be understood then that data processing systems 330 can, for example, convert analog signals to readable digital signals (or digital values). It will be understood that data processing systems 330 can, for example, process captured images to extract values (e.g., pixel values, etc.), and can further convert the extracted values. It will be understood that data processing systems 330 can perform pre-processing and post-processing. It will be understood that data processing systems 330 can perform various forms of aggregation on the extracted or converted values.

Monitoring mode identification system 332 is operable to identify a monitoring mode for use in controlling the monitoring operation of one or more drones 200. Each monitoring mode can include a given set of one or more types of crop loss to be monitored or can correspond to different area(s) or worksite (e.g., area of the worksite relative to the harvester 100), or both. Thus, a monitoring mode can indicate, and be used to identify, the crop loss to be monitored by the one or more drones 200 or the areas to be monitored by the one or more drones 200, or both. There can be preset (or preconfigured monitoring modes) or customized monitoring modes. An operator or user can select a preset (or preconfigured) monitoring mode or select a customized monitoring mode (the operator or user selection being indicated by monitoring selection data). In some examples, the monitoring mode can be default and changeable by operator or user selection. In some examples, crop loss monitoring system 235 can select and change the monitoring mode.

Some examples of preset (or preconfigured) monitoring modes include a total crop loss monitoring mode, a pre-harvest crop loss monitoring mode, a harvesting crop loss monitoring mode, a header crop loss monitoring mode, and a machine crop loss monitoring mode. In the total crop loss monitoring mode, one or more drones 200 are controlled to monitor for total crop loss (pre-harvest crop loss and harvesting crop loss). In the pre-harvest crop loss monitoring mode, one or more drones 200 are controlled to monitor for pre-harvest crop loss in unharvested areas of the worksite, such as by monitoring ahead of the harvester 100, relative to a travel direction or route of the harvester 100. The unharvested areas can be on a current pass of the machine or in an upcoming pass of the machine. In the harvesting crop loss monitoring mode, one or more drones 200 are controlled to monitor for harvesting crop loss, which, as previously discussed, depending on the type of harvester 100, can include both header crop loss and machine crop loss. In the harvesting crop loss monitoring mode, the one or more drones 200 are controlled to monitor an area extending behind the forward or distal end of the header or behind the harvester 100, or both, relative to the travel direction or route of the harvester 100. In the header crop loss monitoring mode, one or more drones 200 are controlled to monitor for header crop loss, in an area extending behind the forward or distal end of the header of the harvester 100, relative to a travel direction or route of the harvester 100. In the machine crop loss monitoring mode, one or more drones are controlled to monitor for machine crop loss, behind the harvester 100 relative to a travel direction or a route of the harvester 100.

A user or operator, or system 235, can generate a customized monitoring mode. The customized monitoring mode can indicate the crop loss of interest or the areas of interest, or both. In one example, a customized monitoring mode can be a select combination of two or more of pre-harvest crop loss monitoring, header crop loss monitoring, or machine crop loss monitoring.

As discussed, monitoring mode identification system 332 can identify the monitoring mode based on monitoring selection data 506, or the monitoring mode can be default (and changeable based on other input). In other examples, monitoring mode identification system 332 can identify a monitoring mode based on attributes at the worksite or based on performance of sensors 408 on-board a harvester 100. For example, where, an attribute, such as an obstruction (e.g., debris (e.g., dust) cloud, other types of obstructions), is detected at the worksite in a location that can affect (e.g., diminish the quality of, prevent, etc.) the sensing of a sensor system 427, monitoring mode identification system 332 can identify a monitoring mode (customized or preset (or preconfigured) monitoring mode) that compensates for that effect (e.g., causes the one or more drones 200 to fill in or substitute for the affected sensor system 427). In another example, monitoring mode identification system 332 can identify a monitoring mode based on performance of a sensor system 427, as indicated, for instance, by feedback or sensor data generated by the sensor system 427. For example, where a sensor system 427 is providing feedback or sensor data indicative of error or low quality detection, monitoring mode identification system 332 can identify a monitoring mode (customized or preset (or preconfigured) monitoring mode) that compensates for the impacted sensor performance (e.g., causes one or more drones 200 to fill in or substitute for the erroneous or low performance sensor system 427). As an illustrative example, a sensor system 427 could be utilized to detect, as an example, header crop loss. However, due to an obstruction or, some other cause, the performance of the sensor system 427 may be diminished, in which case, monitoring mode identification system 332 can identify a monitoring mode to control one or more drones to provide header crop loss, as a substitute or fill in for the affected sensor system 427.

Monitoring priority identification system 334 is operable to identify a priority of crop loss, areas, or monitoring modes, such a hierarchy (e.g., ranked list) of crop loss, areas, or monitoring modes. Travel and positioning of one or more drones can be controlled based on the priority. Monitoring priority identification system 334 can identify a priority of crop loss, areas, or monitoring modes, based on priority data 505. For instance, priority data 505 can include operator or user selected priorities, default priorities, or learned priorities (learned during previous operations). In other example, monitoring priority identification system 334 can identify a priority based on attributes at the worksite or based on performance of sensor systems 427 on-board a machine 100. For example, priority of crop loss, areas, or monitoring modes to be monitored can be determined based on one or more other attributes at the worksite. For instance, where, an attribute, such as an obstruction (e.g., debris (e.g., dust) cloud, or other obstruction), is detected at the worksite in a location that can affect (e.g., diminish the quality of, prevent, etc.) the sensing of sensor systems 427, monitoring priority identification system 334 can identify a priority that compensates for that effect (e.g., causes one or more drones to fill in or substitute for the affected sensor systems 427, that is, prioritizes the crop loss, the area(s), or monitoring mode that fills in or substitutes for the affected sensor systems 427). Priority of crop loss, areas, or monitoring modes to be monitored can be determined based on performance of sensor systems 427. For instance, where a sensor system 427 is providing feedback or sensor data indicative of error or low quality detection, monitoring priority identification system 334 can identify a priority that compensates for the impacted sensor performance (e.g., causes one or more drones to fill in or substitute for the erroneous or low performance sensor system 427, that is, prioritizes the attributes, or area, or monitoring mode that fills in or substitutes for the affected sensor(s) 408).

An order in which a drone 200 monitors each crop loss type of a plurality of crop loss types to be monitored, or an order in which a drone 200 monitors each area of a plurality of areas to be monitored, or an order in which a drone 200 performs each monitoring mode of a plurality of monitoring modes to be performed can be determined based off a priority (e.g., monitoring or performing first the highest priority and monitoring or performing subsequently according to descending priority). The amount of time or frequency with which a drone 200 monitors each crop loss type of a plurality of crop loss types to be monitored, or an order in which a drone 200 monitors each area of a plurality of areas to be monitored, or an order in which a drone 200 performs each monitoring mode of a plurality of monitoring modes to be performed can be determined based off a priority (spending more time monitoring or performing the higher priority crop loss types or monitoring modes relative to lower priority crop loss type or monitoring modes).

Obstruction identification system 336 is operable to identify an obstruction, and characteristics thereof, based on one or more items of data 205/305/405/525, such as, but not limited to, sensor data 501, operation data 502, system data 503, and worksite data 504. For example, sensors 208 or 408 can provide sensor data indicative of the presence and location of an obstruction (e.g., a debris (e.g., dust), other type of obstruction, etc.) based upon which obstruction identification system 336 can identify the type, presence, and location of the obstruction. In some examples, obstruction identification system 336 can further estimate (or predict) movement and future locations of the obstruction based on sensor data 501 or worksite data 504. For instance, obstruction identification system 336 can estimate (or predict) how an obstruction, such as a debris cloud, will move and to what future locations based on weather attributes, such as wind speed and direction. In some examples, obstruction identification system 336 can predict type, presence, and locations of obstructions, such as debris clouds, based on sensor data 501 or worksite data 504 providing weather attributes such as wind speed and direction, temperature, humidity, and dewpoint as well as providing soil attributes, such as soil moisture and soil type, and, in some examples, based further on operation data 502 indicative of the type of harvesting operation being performed and system data 503 indicative of the configuration and dimensions of the harvester 100. The travel of a drone 200 can be controlled based on an identified and/or predicted obstruction, and characteristics thereof. For example, the position or location of a drone 200 can be controlled to account for the obstruction such that the drone 200 can monitor the crop loss, areas, or modes accounting for the obstruction (i.e., the drone 200 can be positioned such that the obstruction does not interfere with the desired monitoring). The monitoring sequence (the order of crop loss, areas, or modes monitored and the amount of time spent monitoring each crop loss, each area, or each mode) can be controlled to account for the obstruction such that the drone 200 can monitor the crop loss, areas, or modes accounting for the obstruction (i.e., the order or amount of time can be adjusted to prevent the obstruction from interfering with operation of the harvester 100).

Crop loss and area location identification system 338 is operable to identify the locations of the crop loss or areas to be monitored based on the identifications of monitoring mode identification system 332 (e.g., identified monitoring mode, identified areas to be monitored, or identified crop loss to be monitored) as well as sensor data 501 or operation data 502, or both, indicative of a location and heading of the harvester 100. In addition to identifying locations of the attributes or areas, crop loss and area location identification system 338 can identify a location of measurement areas corresponding to the crop loss or areas based on various data, such as sensor data 501 indicative of a travel speed of the harvester 100, system data 503 (e.g., system data 503 indicative of a latency of controllable subsystems 416 of harvester 100, system data 503 indicative of sensor data latency, system data 503 indicative of dimensions of the header, etc.), operation data 502 indicative the type of harvesting being performed by the harvester 100, or based on the identified crop loss or areas. As an example, monitoring mode identification system 332 can identify an area, crop loss, or mode that requires monitoring ahead of the harvester 100, such as pre-harvest crop loss monitoring. Crop loss and area location identification system 338 can identify the locations of the crop loss or areas as being locations ahead of the harvester 100, relative to the travel direction or route of the harvester. These locations can be in a current pass of the harvester 100 or in an upcoming pass of the harvester 100. Further, crop loss and area location identification system 338 can identify a measurement area that is spaced ahead of the harvester (e.g., relative to the travel direction of the harvester or the route of the harvester) by a given distance based on the travel speed of the harvester 100, as well as based on various latencies (e.g., latency of the controllable subsystems 416 of the harvester 100 or sensor data latency, or both) such that crop loss is detected and transmitted in a sufficient manner to allow for proactive control of the harvester 100. Still further, crop loss and area location identification system 338 can identify a measurement area that maximizes the resolution of the sensor data while still allowing for detection of the necessary crop loss for control. For instance, a UAV 200-1 could be flown high and detect a larger area ahead of the machine 100, however, the resolution of the sensor data, and thus, potentially, the accuracy of the sensor data may be less than the resolution and accuracy of sensor data resulting from smaller measurement area (e.g., where the UAV 200-1 is positioned lower). Additionally, detecting a relatively smaller measurement area for a given control cycle can reduce the complexity or load of processing on the resultant sensor data. Additionally, it will be understood that the measurement area can be varied by crop loss and area location identification system 338 based on the type of sampling to be undertaken.

Figure 8:
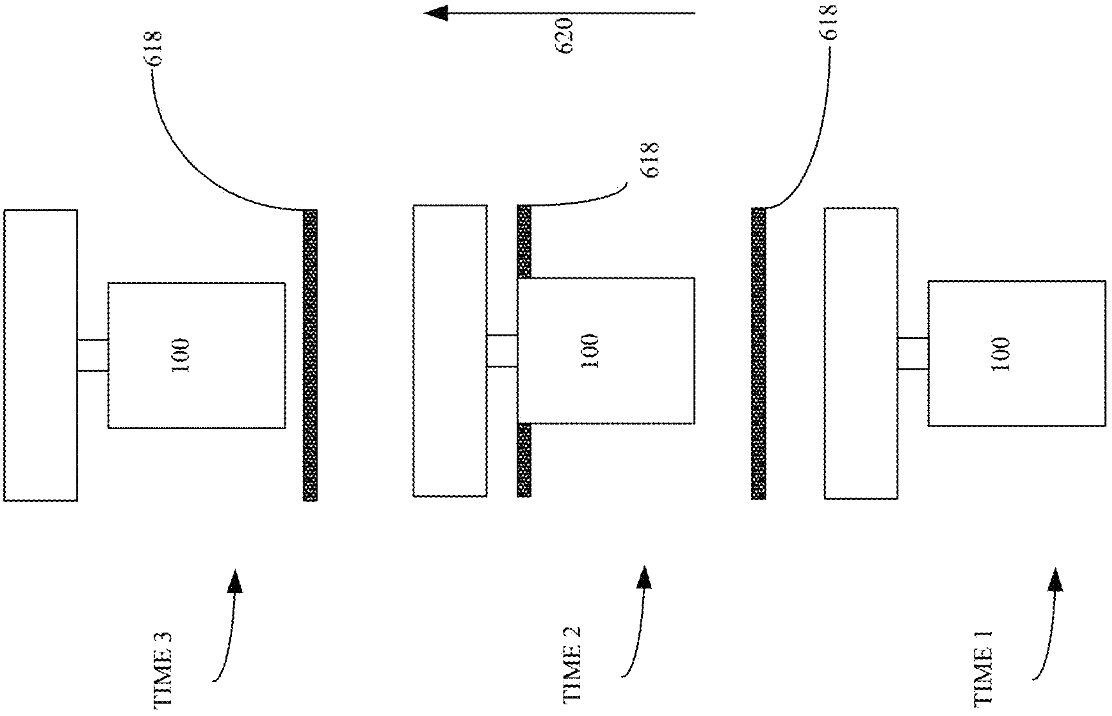
FIG. 8 is a partial pictorial, partial diagrammatic view showing one example crop loss monitoring operation of the agricultural harvesting system architecture.

In one type of sampling, a drone 200 may take multiple samples of crop loss from a measurement area extending a given width (e.g., width of the header, etc.) and extending a given length, the multiple samples can be aggregated (e.g., averaged, etc.) to generate a resultant crop loss value. For instance, a drone 200 may be controlled to detect multiple samples of crop loss in a measurement area. The multiple samples can be aggregated to generate a crop loss value indicative of the crop loss corresponding to the measurement area. In one example, each sample can correspond to a different sub-area of the measurement area. In one example, a drone 200 generates separate sensor data (e.g., a separate image, a separate signals) for each sample and corresponding to the sub-area. In one example, a drone generates sensor data (e.g., an image, a signal) for the entirety of the measurement area, and the sensor data is processed (e.g., parsed into different sub-areas) to detect the multiple samples. An example of this type of sampling is shown in FIG. 8.

Figure 9:
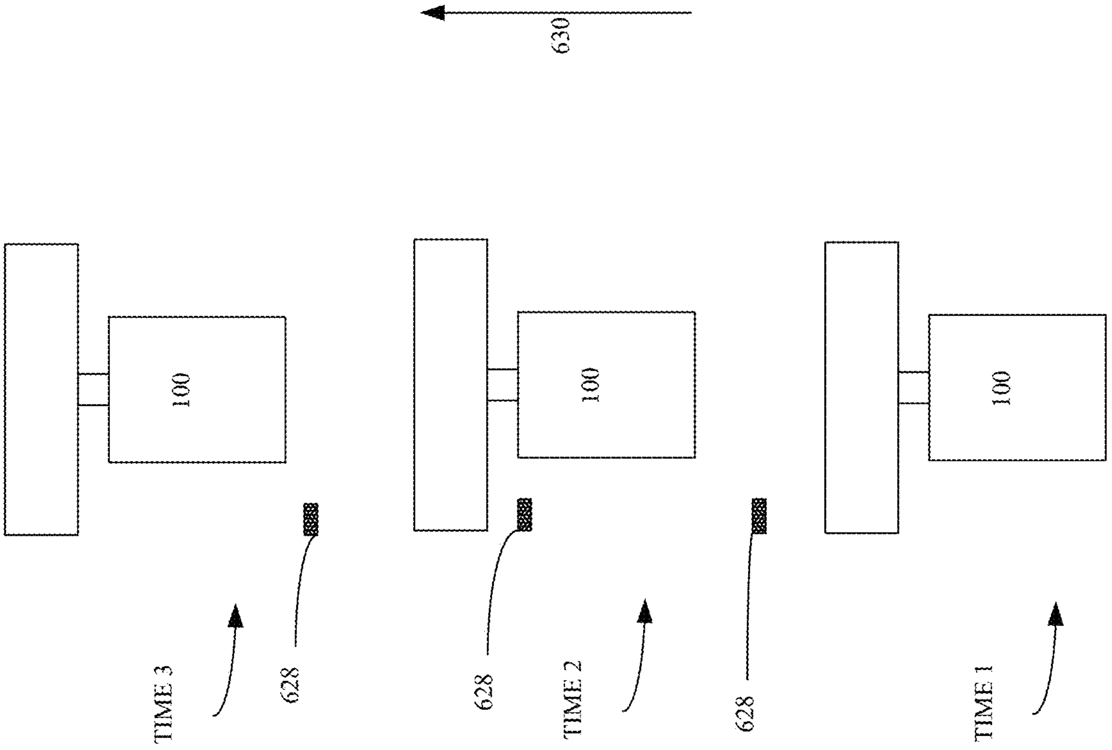
FIG. 9 is a partial pictorial, partial diagrammatic view showing one example crop loss monitoring operation of the agricultural harvesting system architecture.

In another type of sampling, a drone 200 may take a single sample of crop loss from a measurement area of a given width and length. A factor, equation, or a model can be utilized and applied to the single sample of crop loss in order to generate a crop loss value indicative of crop loss in a broader area (i.e., broader than the measurement area). For instance, a single sample of crop loss can be detected in a measurement area, and the single sample can be extrapolated (e.g., with a factor, an equation, a model, etc.) to generate a crop loss value indicative of crop loss corresponding a broader area. An example of this type of sampling is shown in FIG. 9.

Figure 10:
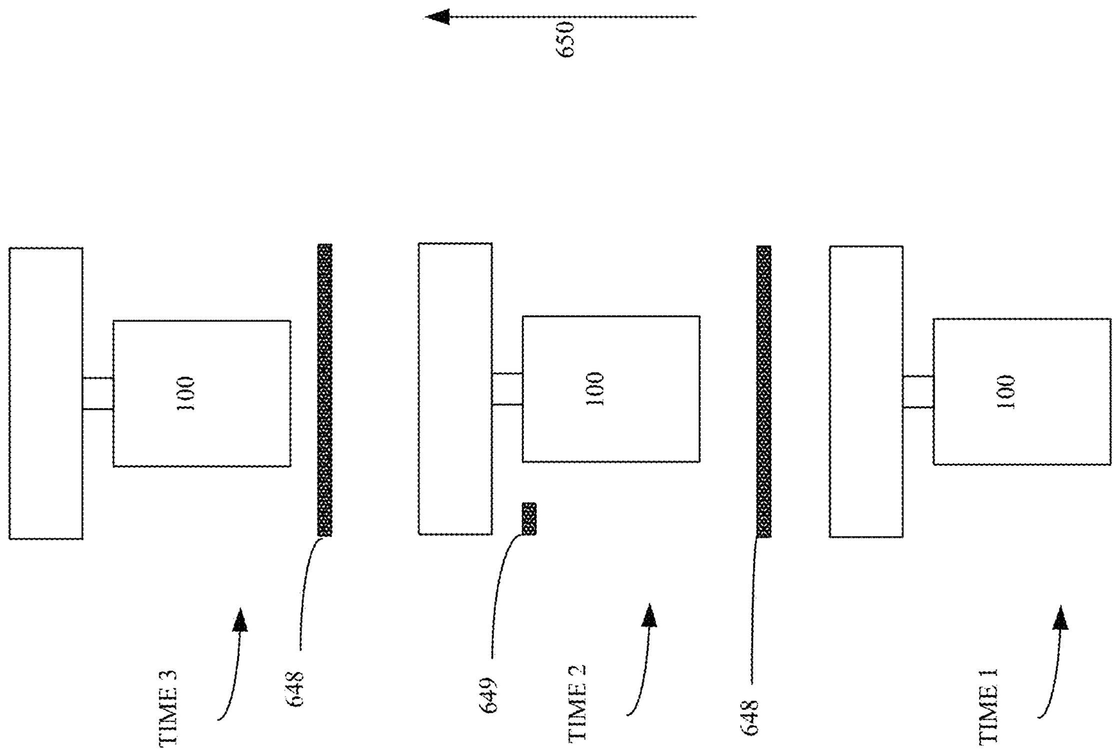
FIG. 10 is a partial pictorial, partial diagrammatic view showing one example crop loss monitoring operation of the agricultural harvesting system architecture.

In some examples, multiple types of sampling can be executed during the course of crop loss monitoring (an example of which is shown in FIG. 10).

Additionally, in at least some examples, the measurement area where pre-harvest crop loss is monitored, is also the measurement area in which harvesting crop loss is monitored. This improves the accuracy of the total crop loss value, as well as the crop loss values attributable to the different categories or sub-categories of crop loss. The location of this measurement area can be identified by crop loss and area location identification system 338. Examples of this are illustrated in FIGS. 8-10.

Sensor selection identification system 340 is operable to identify one or more sensors of sensor system 280 to be utilized as a drone 200 monitors. In some examples, for a given travel path, sensor selection identification system 340 can identify a respective set of one or more sensors of sensor system 280 for each monitoring location in the travel path. Sensor selection identification system 340 can identify the sensors based on identifications of monitoring mode identification system 332 (e.g., identified monitoring mode, identified areas to be monitored, or identified crop loss to be monitored), as well as other data, such as data indicative of crop type. For example, the type of crop loss to be detected can be determinative of the type of sensors to be utilized. For instance, one type of sensor may be more suitable for pre-harvest crop loss monitoring than another type of sensor. In another example, one type of sensor may be more suitable for crop loss monitoring for a given crop type as compared to another type of sensor. Additionally, the area to be detected can be determinative of the type of sensors 208 to be utilized. Additionally, sensor selection identification system 340 is operable to identify one or more sensors based on obstructions, and characteristics thereof, as identified by obstruction identification system 336. For example, one type of sensor may be better suited to detect through an obstruction than another type of sensor. Additionally, sensor selection identification system 340 is operable to identify one or more sensors based on other attributes at the worksite (e.g., as indicated by sensor data 501 or worksite data 504). For example, one type of sensor may be preferable over another type of sensor 208 depending on other attributes of the worksite. For instance, depending on the presence, type, and level of precipitation at the worksite, one type of sensor may be preferable over another type of sensor.

Sensor selections can be provided, as a monitoring output 360, to one or more items of system 500, including control system 214. A controller 235 (e.g., a sensor configuration controller 235) can control sensor configuration subsystem 253 to control the activation and deactivation of sensors 280 according to the sensor selections. Each monitoring location in a travel plan may have a respective set of one or more sensors to be utilized, as identified by sensor selection identification system 340, and sensor configuration subsystem 253 can be controlled accordingly.

Travel plan system 342 is operable to generate travel plans for a drone 200 based on identifications of monitoring mode identification system 332, monitoring priority identification system 334, obstruction identification system 336, crop loss and area location identification system 338 as well as one or more of sensor data 501, operation data 502, system data 503, worksite data 504, priority data 505, monitoring selection data 506, threshold data 507, or other data 510. A travel plan includes one or more monitoring locations, a travel path (e.g., flight path, route, etc.) that guides a drone 200 to and between the monitoring locations, as well as a monitoring sequence. Monitoring locations are locations at which a drone 200 is to be positioned to monitor crop loss or an area of interest. In some examples, a monitoring location is referenced to a harvester 100 (e.g., the monitoring location is a location relative to a machine 100). In some examples, a monitoring location is referenced to the worksite (e.g., the monitoring location is a location relative to the worksite). A travel path is a route along which a drone 200 is to travel to a monitoring location and between monitoring locations. A monitoring sequence indicates an order in which monitoring locations are to be traveled to by a drone 200 as well as duration of time that a drone 200 is to spend at each monitoring location.

Location logic 350 is operable to identify one or more monitoring locations for each travel plan generated by travel plan system 342 based on identifications of monitoring mode identification system 332, monitoring priority identification system 334, obstruction identification system 336, crop loss and area location identification system 338 as well as one or more of sensor data 501, operation data 502, system data 503, worksite data 504, priority data 505, monitoring selection data 506, threshold data 507, or other data 510. For example, based on the crop loss or areas to be detected (e.g., as indicated by monitoring mode identification system 332) and the locations of the crop loss or areas (e.g., as indicated by monitoring location identification system 338) location logic 350 is operable to identify one or more monitoring locations to position a drone 200 to detect the crop loss or areas to be detected. Additionally, location logic 350 can identify the monitoring locations to account for obstructions (e.g., as indicated by obstruction identification system 336), that is, to identify monitoring locations that position a drone 200 to be able to detect the crop loss or areas in spite of the obstructions. Additionally, location logic 350 can identify the monitoring locations based on system data 503, such as machine data indicative of dimensions of a harvester 100 and positions of components of machine 100 and machine data indicative of latency of the harvester 100, and worksite data 504, such as worksite data indicative of locations and dimensions of worksite features. Additionally, location logic 350 can identify the monitoring locations based on one or more of a variety of other identifications or data.

Sequence logic 352 is operable to identify a monitoring sequence for each travel plan generated by travel plan system 342 based on the monitoring locations identified by location logic 350, priorities identified by monitoring priority identification system 334, obstructions identified by obstruction identification system 336 as well as one or more of sensor data 501, operation data 502, system data 503, worksite data 504, priority data 505, monitoring selection data 506, threshold data 507, or other data 510. For example, sequence logic 352 is operable to identify a monitoring sequence for a given set of one or more monitoring locations identified by location logic 350 and based on a priority identified by monitoring priority identification system 334. For example, a sequence can cause a drone 200 to travel to monitoring locations according to the priority of the crop loss or areas to which each monitoring location corresponds (e.g., travel first to the monitoring location corresponding to the highest priority and travel to each subsequent monitoring locations in order of descending priority). Additionally, a sequence can cause a drone 200 to spend more time at a monitoring location, relative to another monitoring location, based on the priority of the crop loss or areas to which each monitoring location corresponds (e.g., spend more time at higher priority monitoring locations than at a lower priority locations). It will be understood that a sequence can be disjointed.

For example, for a given travel plan, there could be four monitoring locations (1, 2, 3, and 4). In the example, location 1 has the highest priority, location 2 has a second highest priority, location 3 has the third highest priority, and location 4 has the fourth highest (or lowest) priority. In one example, the sequence could be in descending order of priority going first to location 1, then to location 2, then to location 3, and then to location 4, and then starting the cycle over by going back to location 1. The drone 200 could be controlled to spend more time at each location relative to the other. For instance, 10 seconds at location 1, 8 seconds at location 2, 6 seconds at location 3, and 4 seconds at location 4 for each cycle. Not all of the durations (duration being the amount of time the drone spends at each monitoring location) need be different. For a set of monitoring locations, any combination of durations for a monitoring sequence is possible, for example, all of the durations being the same, all of the durations being different, or some combination of different and same durations. In other examples, the sequence could be in a disjointed order. For instance, keeping with the same 4 locations discussed above, the sequence could be travel first to location 1, then to location 2, then back to location 1, then to location 3, then back to location 1, and then to location 4, and then back to location 1 to start the cycle over. The duration at each location could be the same for each time a drone 200 is positioned there, but the higher priority location will have a higher total duration due to the frequency with which the drone 200 is controlled to travel there during the sequence. Alternatively, the durations could all be different, or the durations of some could be different and the durations of others could be the same. In other examples, a lower priority monitoring location could be visited first. For instance, keeping with the same 4 locations, the drone 200 could be controlled to travel first to location 3, then to location 1, then to location 2, then to location 4, and then back to 3 to start the cycle over.

A lower priority location can be visited first to account for attributes at the worksite, such as obstructions. For instance, keeping with the 4 locations, a sequence could cause a drone 200 to travel first to one or more of locations 2, 3, or 4 before traveling to location 1 to account for an obstruction that would affect detection at monitoring location 1. For example, suppose an obstruction, such as the extended chute 135 of a harvester 100-1 will be present for a limited amount of time (e.g., during the duration of an unloading operation) that would interfere with detection at location 1, the drone 200 could be controlled to travel first to one or more of locations 2, 3, or 4, before traveling to location 1, for instance, waiting to travel to location 1 until the chute 135 is retracted (e.g., once the unloading operation is ended). In another example, suppose an obstruction, such as a debris cloud, would interfere with detection at location 1 for a given amount of time (e.g., given the travel direction of the machine 100 and the wind direction), the drone 200 could be controlled to travel first one or more of locations 2, 3, or 4, before traveling to location 1, for instance, waiting to travel to location 1 until the debris cloud will no longer interfere with detection at location 1 (e.g., when the travel direction of the machine 100 has changed or perhaps, when the wind direction has changed). These are merely some examples. Of course, it will also be understood, as explained above, that the monitoring locations could instead be changed to account for attributes at the worksite, such as obstructions.

Additionally, it will be understood that each travel plan could have multiple sequences, for instance, keeping with the same 4 locations, a first sequence that causes the drone 200 to travel to location 1, then to location 2, then to location 3, then to location 4, with an associated duration for each location, and then a second sequence causing the drone 200 to travel to location 1, then to location 2, then back to location 1, then to location 3, then back to location 1, and then to location 4, with an associated duration for each location which may be different or the same as the durations of sequence 1. Multiple sequences can be used to account for variables at the worksite, as indicated by data 205/305/405/525, or based on dynamically shifting priorities.

These are merely some examples. As can be seen, sequence logic 352 can identify a sequence identifying an order in which monitoring locations are visited as well as a duration that the drone 200 spends at each monitoring location (both a total duration and a duration for each visit), and further, multiple different sequences for a travel plan, and further, that a sequence can be adjusted or generated dynamically. As can be seen, sequence logic 352 can identify the order and the durations based on priorities. Further, as can be seen, sequence logic 352 can identify the order and the durations based on obstructions.

Path logic 354 is operable to identify a travel path or route to and between monitoring locations for each travel plan generated by travel plan system 342 based on the monitoring locations identified by location logic 350, the sequence(s) identified by sequence logic 352, obstructions identified by obstruction identification system 336 as well as one or more of sensor data 501, operation data 502, system data 503, worksite data 504, priority data 505, monitoring selection data 506, threshold data 507, or other data 510. For example, the travel path can take into account dimensions of a harvester 100, location of components of a harvester 100, obstructions, locations and dimensions of worksite features, as well as various other identifications and data to avoid collision between a drone 200 and other items or to avoid interference with the monitoring.

Each travel plan, including the monitoring locations, the sequence(s), and the travel path, can be provided, as a monitoring output 360, to one or more items of system 500, including, control system 214. A controller 235 (e.g., a travel controller 235) can control travel subsystem 252 to control the travel and positioning of a drone 200 according to the travel plan (e.g., to travel to and maintain position at monitoring locations according to the sequence(s) and travel path). When a monitoring location is a location relative to a harvester 100, it will be understood that the travel subsystem 352 can be controlled to maintain the drone 200 at the monitoring location relative to the harvester 100 even while the harvester 100 is moving.

Crop loss identification system 344 is operable to identify crop loss values, at least, crop loss sensor data of sensor data 501. In some examples, crop loss identification system 344 utilizes the processed sensor data 501 generated by data processing systems 330. A crop loss value can be a total crop loss value (value representative of the total of pre-harvest crop loss and harvesting crop loss). A crop loss value can be a pre-harvest crop loss value (value representative of pre-harvest crop loss). A crop loss value can be a harvesting crop loss value (value representative of the harvesting crop loss). As previously discussed, in some examples, harvesting crop loss can have multiple sub-categories (e.g., header crop loss and machine crop loss). Accordingly, in such examples, a crop loss value can be a header crop loss value (value representative of header crop loss), a machine crop loss value (value representative of machine crop loss), and a harvesting crop loss value (value representative of the total of header crop loss and machine crop loss). Accounting for pre-harvest crop loss can result in a more accurate harvesting crop loss value (including a more accurate header crop loss value and machine crop loss value).

Detecting the amount of pre-harvest crop loss provides for a more accurate accounting of the crop loss attributable to harvesting crop loss. As an example, by detecting the pre-harvest crop loss value, a more accurate harvesting crop loss value can be detected. For instance, having detected the pre-harvest crop loss value ahead of the harvester, crop loss at a measurement area associated with harvesting crop loss (e.g., in an area extending behind the forward or distal end of the header or behind the harvester) can be detected to generate a crop loss value (which is the combination of pre-harvest crop loss and harvesting crop less) and therefrom, the pre-harvest crop loss value can be subtracted to obtain the harvesting crop loss value. Similarly, as another example, by detecting the pre-harvest crop loss value, a more accurate header crop loss value and a more accurate machine crop loss value can be detected. For instance, having detected the pre-harvest crop loss value ahead of the harvester, crop loss at a measurement area associated with header crop loss (e.g., in an area extending behind the forward or distal end of the header but not yet behind the harvester) can be detected to generate a crop loss value (which is the combination of pre-harvest crop loss and header crop less) and therefrom, the pre-harvest crop loss value can be subtracted to obtain the header crop loss value. Additionally, having detected the pre-harvest crop loss value and the header crop loss value, crop loss at a measurement area associated with machine crop loss (e.g., behind the harvester) can be detected to generate a crop loss value (which is a combination of pre-harvest crop loss, header crop loss, and machine crop loss) and therefrom, the pre-harvest crop loss value and the header crop loss value (or the crop loss value which is the combination of pre-harvest crop loss and header crop loss) can be subtracted to obtain the machine crop loss value.

Crop loss values may be expressed in various ways; some examples include bushels per acre (e.g., a loss of 3 bushels per acre) or a percentage such as a percentage of the available yield lost (e.g. 3%).

Comparison logic 346 is operable to compare crop loss values to corresponding crop loss threshold values and generate an output indicative of the comparison (e.g., output indicative of a difference between the crop loss value and the corresponding crop loss threshold value). In some examples, resultant control is based on crop loss values relative to corresponding crop loss thresholds.

It can be seen that system 235 is operable to produce one or more monitoring outputs 360. A monitoring output 360 can include one or more of one or more travel plans (each including one or monitoring locations, one or more sequences, and one or more travel paths), one or more monitoring mode identifications, one or more monitoring priority identifications, one or more obstruction identifications, one or more crop loss and area location identifications, one or more sensor selection identifications, one or more crop loss values, one or more comparisons, or one or more other items. A monitoring output 360 can be used in the control of one or more mobile work machines (e.g., one or more harvesters 100 and one or more drones 200). For example, a monitoring output 360 can be obtained (e.g., retrieved or received) by one or more control systems 414 to control one or more harvesters 100 (e.g., one or more controllable subsystems 416, etc.) and by one or more control systems 214 to control one or more drones 200 (e.g., one or more controllable subsystems 216, etc.). Additionally, or alternatively, a monitoring output 360 can be presented (e.g., displayed, etc.) to one or more operators or one or more users, or both. For example, a monitoring output 360 can be obtained (e.g., retrieved or received) by one or more control systems 414 to control one or more interface mechanisms 418 to present (e.g., display, etc.) information of (or based on) the monitoring output 360 to one or more operators 361 of one or more harvesters 100 and by one or more control systems 214 to control one or more interface mechanisms 218 to present (e.g., display, etc.) information of (or based on) the monitoring output 360 to one or more operators 361 of one or more drones 200. Additionally, or alternatively, a monitoring output 360 can be obtained (e.g., retrieved or received) by various other items and used in various other ways. For example, but not by limitation, a monitoring output 360 can be obtained (e.g., retrieved or received) by one or more other items 367, such as one or more interface mechanisms 364 which can present (e.g., display, etc.) information of (or based on) the monitoring output 360 to one or more users 366.

Figure 7B:
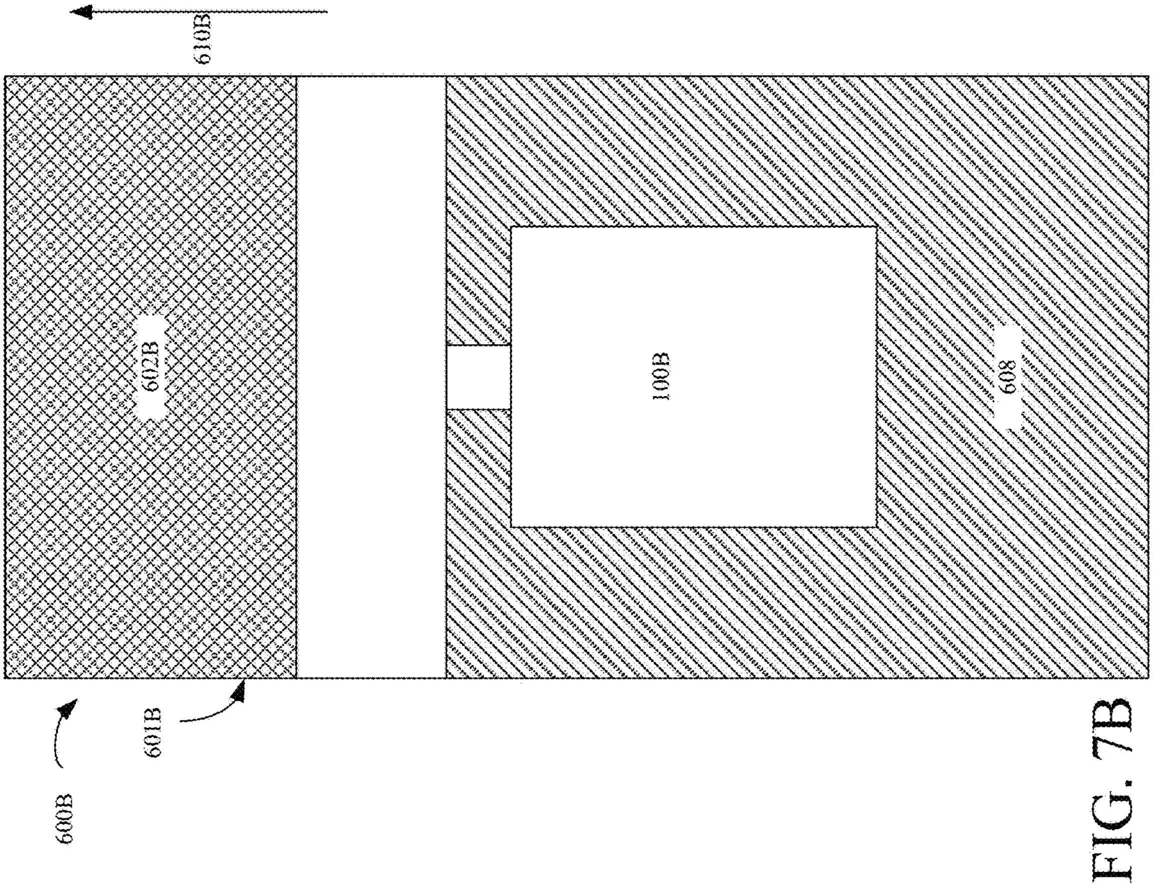
FIGS. 7A and 7B are pictorial illustrations showing examples of crop loss monitoring areas.
Figure 7A:
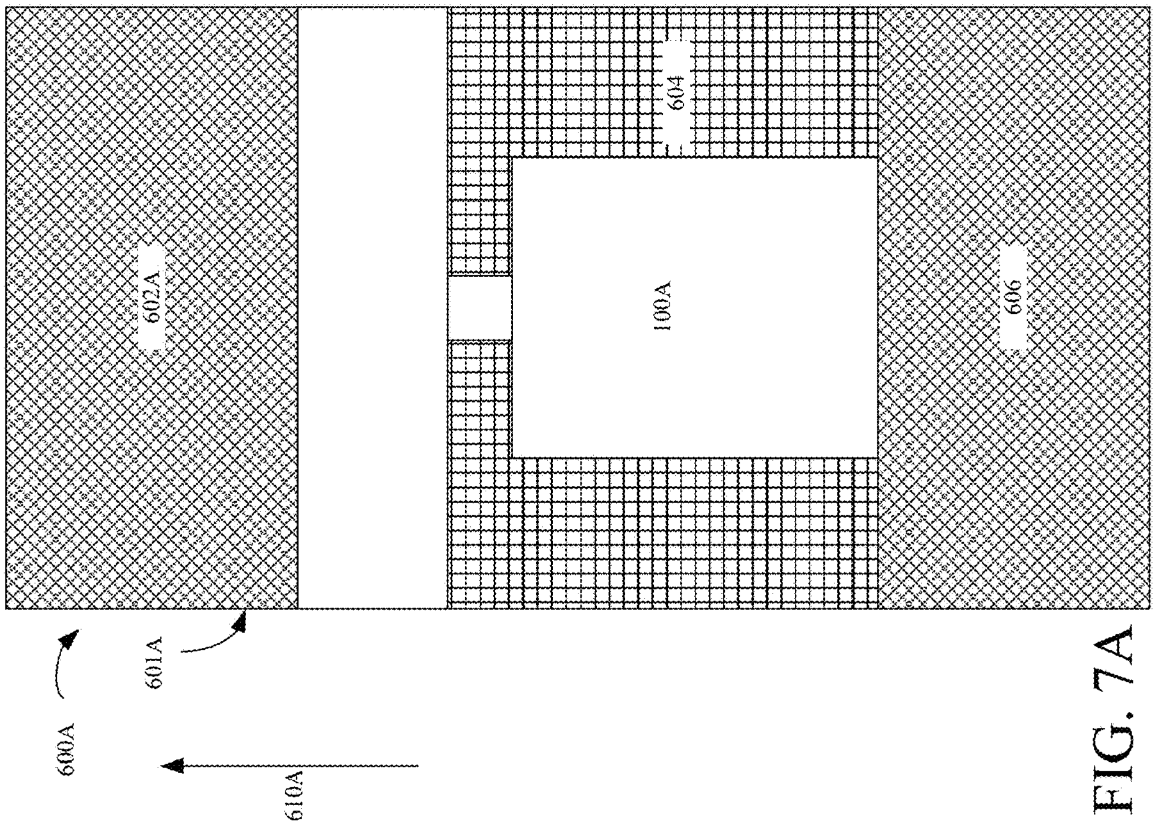

FIGS. 7A-7B are pictorial illustrations showing examples of a crop loss monitoring environment 600.

As shown in FIG. 7A, environment 600 (illustratively 600A) includes a worksite 601A, a harvester 100A, and a plurality of crop loss monitoring areas 602A, 604, and 606. The example shown in FIG. 7A corresponds to an example in which harvesting crop loss includes both header crop loss and machine crop loss, such as in the case of a combine harvester. Crop loss monitoring area 602A is a pre-harvest crop loss monitoring area and is ahead of the harvester 100A, relative to the travel direction or route 610A. As shown, crop loss monitoring area 602A extends the width of the header, though, in other examples, could extend a different width such as a width less than the width of the header or a width greater than the width of the header. Crop loss monitoring area 604 is a header crop loss monitoring area and extends behind a forward (or distal) end of the header of harvester 100A, relative to the travel direction or route 610A. As shown, crop loss monitoring area 604 extends the width of the header and from a forward (or distal) end of the header (e.g., the forward or distal tip of the cutter bar, crop engaging component (e.g., reel, row units, etc.), etc.) to the back end of the harvester 100A. In other examples, the monitoring area 604 could extend a different width, such as a width less than the width of the header or a width greater than the width of the header. In some examples, crop loss monitoring area 604 may extend beyond the width of the header, such as to detect crop that is tossed over the side of the header. Additionally, it will be understood that the crop loss monitoring area 604 can include the area of the worksite underneath the header as well as the header itself. Crop loss monitoring area 606 is machine crop loss monitoring area and is behind the harvester 100A, relative to the travel direction or route 610A. As shown, crop loss monitoring area extends the width of the header. However, in other examples, the width of crop loss monitoring area 606 may correspond instead to a residue dispersal area (e.g., residue spread by a spreader (e.g., 142, etc.) or residue dropped in a windrow). Thus, in other examples, the monitoring area could extend a different width, such as a width less than the width of the header or a width greater than the width of the header.

As shown in FIG. 7B, environment 600 (illustratively 600B) includes a worksite 601B, a harvester 100B, and a plurality of crop loss monitoring areas 602B and 608. The example shown in FIG. 7B corresponds to an example in which harvesting crop loss does not separate into the subcategories header crop loss and machine crop loss, such as in the case of a forage harvester. Crop loss monitoring area 602B is a pre-harvest crop loss monitoring area and is ahead of the harvester 100B, relative to the travel direction or route 610B. As shown, crop loss monitoring area 602B extends the width of the header, though, in other examples, could extend a different width such as a width less than the width of the header or a width greater than the width of the header. Crop loss monitoring area 608 is a harvesting crop loss monitoring area and extends from a forward or distal end of the header (e.g., the forward or distal tip of the cutter bar, crop engaging component (e.g., reel, row units, etc.), etc.) to behind the harvester 100B. As shown, crop loss monitoring area 608 extends the width of the header, though, in other examples, could extend a different width such as a width less than the width of the header or a width greater than the width of the header.

It will be understood that, as used herein, with reference to crop loss monitoring, monitoring ahead of the harvester 100, relative to the travel direction or the route of the harvester 100, can include monitoring ahead on the current pass or ahead on an upcoming pass. It will be understood that, as used herein, with reference to crop loss monitoring, monitoring behind a forward or distal end of the header or behind the harvester 100, relative to the travel direction or the route of the harvester 100, can include monitoring behind on the current pass or behind on a previous pass. For example, by the time harvesting crop loss is monitored, a harvester 100 may be on a new current pass and the area to be monitored may be on the previous pass.

FIG. 8 is a partial pictorial, partial diagrammatic view showing one example crop loss detection sampling method. In the example shown in FIG. 8, the sampling method includes detecting a respective set of samples of crop loss in a measurement area 618 at each of a plurality of different times. The measurement area 618 is located differently, relative to the harvester 100, at each time, but still corresponds to the same location of the worksite. As previously explained, each sample, of each respective set of samples, can correspond to a different sub-area of the measurement area. In one example, separate sensor data (e.g., a separate image, a separate signal) is generated for each sample and corresponding to the corresponding sub-area. The sub-areas at each time the measurement area is detected can be the same sub-areas or can be different sub-areas, or can be a combination of the same sub-areas and different sub-areas. In another example, as previously explained, sensor data (e.g., an image, a signal) is generated for the entirety of the measurement area, and the sensor data is processed (e.g., parsed into different sub-areas) to detect the samples of each respective set of samples.

As shown, at TIME 1, measurement area 618 is located ahead of the harvester 100, relative to the direction of travel or route 620. As shown, measurement area 618 extends a width of the header, but in other examples, could extend other widths. Multiple samples (or measurements) of crop loss will be detected in the measurement area 618 at TIME 1 (it will be understood that TIME 1 can be a range of time to account for the time needed to take multiple samples, but, when a range of time, will still occur while measurement area 618 is ahead of harvester 100). The multiple samples (or measurements) can be aggregated (e.g., averaged, etc.) as discussed above to generate a pre-harvest crop loss value.

As shown, at TIME 2, measurement area 618 is located in an area extending behind the forward or distal end of the header of the harvester 100 (illustratively shown behind the header), relative to the direction of travel or route 620. Multiple samples (or measurements) of crop loss will be detected in the measurement area 618 at TIME 2 (it will be understood that TIME 2 can be a range of time to account for the time needed to take multiple samples, but, when a range of time, will still occur while measurement area 618 is in an area extending behind the forward or distal end of the header but not yet behind the harvester 100). The multiple samples (or measurements) can be aggregated (e.g., averaged, etc.) as discussed above to generate a crop loss value which is a combination of header crop loss and pre-harvest crop loss and the previously detected (at TIME 1) pre-harvest crop loss value can be deducted therefrom to generate a header crop loss value.

As shown, at TIME 3, measurement area 618 is located behind the harvester 100, relative to the direction of travel or route 620. Multiple samples (or measurements) of crop loss will be detected in the measurement area 618 at TIME 3 (it will be understood that TIME 3 can be a range of time to account for the time needed to take multiple samples, but, when a range of time, will occur while measurement area 618 is behind the harvester 100). The multiple samples (or measurements) can be aggregated (e.g., averaged, etc.) as discussed above to generate a crop loss value which is a combination of machine crop loss, header crop loss, and pre-harvest crop loss and the previously detected (at TIME 1) pre-harvest crop loss value and the previously detected (at TIME 2) header crop loss value (or the crop loss value that is a combination of the pre-harvest crop loss and header crop loss) can be deducted therefrom to generate a machine crop loss value.

The example shown in FIG. 8 corresponds to an example in which harvesting crop loss includes both header crop loss and machine crop loss.

In one example, where harvesting crop loss does not include both header crop loss and machine crop loss, the measurement area need only be detected two times (e.g., rather than, for instance, three times in an example where harvesting crop loss does include both header crop loss and machine crop loss), though each time with multiple samples; once (though with multiple samples) when ahead of the harvester for pre-harvest crop loss and once (though with multiple samples) when either in an area extending behind the forward or distal end of the header or behind the harvester to detect harvesting crop loss. In such an example, the crop loss value detected in the measurement area in an area extending behind the forward or distal end of the header or behind the harvester will be a combination of pre-harvest crop loss and harvesting crop loss from which the previously detected pre-harvest crop loss value can be deducted to generate a harvesting crop loss value. This is merely one example. It will be understood that, in other examples, a measurement area can be detected a different number of times, including in other examples where harvesting crop loss does not include both header crop loss and machine crop loss. Thus, the scope of the present disclosure is not limited to the examples described.

FIG. 9 is a partial pictorial, partial diagrammatic view showing one example crop loss detection sampling method. In the example, shown in FIG. 9, the sampling method includes detecting a sample of crop loss in a measurement area 628 at each of a plurality of different times. The measurement area 628 is located differently, relative to the harvester 100 at each time, but still corresponds to the same location of the worksite.

As shown, at TIME 1, measurement area 628 is located ahead of the harvester 100, relative to the direction of travel or route 630. A sample (or measurement) of crop loss will be detected in the measurement area 628 at TIME 1. The sample (or measurement) can be extrapolated (e.g., with a factor, an equation, a model, etc.) as discussed above to generate a pre-harvest crop loss value indicative of pre-harvest crop loss for a broader area (i.e., broader than the measurement area 628), such as an area extending the width of the header.

As shown, at TIME 2, measurement area 628 is located in an area extending behind the forward or distal end of the header of the harvester 100 (illustratively shown behind the header), relative to the direction of travel or route 630. A sample (or measurement) of crop loss will be detected in the measurement area 628 at TIME 2. The sample (or measurement) will be a combination of header crop loss and pre-harvest crop loss. In one example, the previously detected (at TIME 1) pre-harvest crop loss value can be deducted therefrom to generate a header crop loss value for the measurement area, which can then be extrapolated (e.g., with a factor, an equation, a model, etc.) as discussed above to generate a header crop loss value indicative of header crop loss for a broader area (i.e., broader than the measurement area 628), such as an area extending the width of the header. In another example, the sample (or measurement) can be extrapolated (e.g., with a factor, an equation, a model, etc.) as discussed above to generate a crop loss value indicative of crop loss for a broader area (i.e., broader than the measurement area 628), such as an area extending the width of the header, said crop loss value will be a combination of header crop loss and pre-harvest crop loss from which the previously extrapolated pre-harvest crop loss value can be deducted to generate a header crop loss value indicative of header crop loss for the broader area.

As shown, at TIME 3, measurement area 628 is located behind the harvester 100, relative to the direction of travel or route 630. A sample (or measurement) of crop loss will be detected in the measurement area 628 at TIME 3. The sample (or measurement) will be a combination of machine crop loss, header crop loss, and pre-harvest crop loss. In one example, the previously detected (at TIME 1) pre-harvest crop loss value and the previously detected (at TIME 2) header crop loss can be deducted therefrom to generate a machine crop loss value for the measurement area, which can then be extrapolated (e.g., with a factor, an equation, a model, etc.) as discussed above to generate a machine crop loss value indicative of machine crop loss for a broader area (i.e., broader than the measurement area 628), such as an area extending the width of the header. In another example, the sample (or measurement) can be extrapolated (e.g., with a factor, an equation, a model, etc.) as discussed above to generate a crop loss value indicative of crop loss for a broader area (i.e., broader than the measurement area 628), such as an area extending the width of the header, said crop loss value will be a combination of machine crop loss, header crop loss. and pre-harvest crop loss from which the previously extrapolated pre-harvest crop loss value and the previously extrapolated header crop loss value can be deducted to generate a machine crop loss value indicative of machine crop loss for the broader area.

The example shown in FIG. 9 corresponds to an example in which harvesting crop loss includes both header crop loss and machine crop loss.

In one example, where harvesting crop loss does not include both header crop loss and machine crop loss, the measurement area need only be detected two times (e.g., rather than, for instance, three times in an example where harvesting crop loss does include both header crop loss and machine crop loss), once when ahead of the harvester for pre-harvest crop loss and once when either in an area extending behind the forward or distal end of the header or behind the harvester to detect harvesting crop loss. In such an example, the crop loss value detected in the measurement area in the area extending behind the forward or distal end of the header or behind the harvester will be a combination of pre-harvest crop loss and harvesting crop loss from which the previously detected pre-harvest crop loss value can be deducted to generate a harvesting crop loss value. This is merely one example. It will be understood that, in other examples, a measurement area can be detected a different number of times, including in other examples where harvesting crop loss does not include both header crop loss and machine crop loss. Thus, the scope of the present disclosure is not limited to the examples described.

FIG. 10 is a partial pictorial, partial diagrammatic view showing one example crop loss detection sampling method. In the example shown in FIG. 9, the sampling method is a combination sampling method that includes both multiple sampling (as shown in FIG. 8) and single sampling (as shown in FIG. 9). While the illustrated example shows a particular combination of multiple sampling and single sampling, other combinations are contemplated herein.

As shown, at TIME 1, measurement area 648 is located ahead of the harvester 100, relative to the direction of travel or route 650. As shown measurement area 648 extends a width of the header, but in other examples, could extend other widths. Multiple samples (or measurements) of crop loss will be detected in the measurement area 648 at TIME 1 (it will be understood that TIME 1 can be a range of time to account for the time needed to take multiple samples, but, when a range of time, will still occur while measurement area 648 is ahead of harvester 100). The multiple samples (or measurements) can be aggregated (e.g., averaged, etc.) as discussed above to generate a pre-harvest crop loss value.

As shown, at TIME 2, measurement area 649 is located in an area extending behind the forward or distal end of the header of the harvester 100 (illustratively shown behind the header), relative to the direction of travel or route 650. A sample (or measurement) of crop loss will be detected in the measurement area 649 at TIME 2. The sample (or measurement) will be a combination of header crop loss and pre-harvest crop loss. In one example, the previously detected (at TIME 1) pre-harvest crop loss value can be deducted therefrom to generate a header crop loss value for the measurement area, which can then be extrapolated (e.g., with a factor, an equation, a model, etc.) as discussed above to generate a header crop loss value indicative of header crop loss for a broader area (i.e., broader than the measurement area 649), such as an area extending the width of the header. In another example, the sample (or measurement) can be extrapolated (e.g., with a factor, an equation, a model, etc.) as discussed above to generate a crop loss value indicative of crop loss for a broader area (i.e., broader than the measurement area 649), such as an area extending the width of the header, said crop loss value will be a combination of header crop loss and pre-harvest crop loss from which the previously detected pre-harvest crop loss value can be deducted to generate a header crop loss value indicative of header crop loss for the broader area. As illustrated in FIG. 10, measurement area 649 is a sub-area of measurement area 648.

As shown, at TIME 3, measurement area 648 is located behind the harvester 100, relative to the direction of travel or route 620. Multiple samples (or measurements) of crop loss will be detected in the measurement area 648 at TIME 3 (it will be understood that TIME 3 can be a range of time to account for the time needed to take multiple samples, but, when a range of time, will occur while measurement area 648 is behind the harvester 100). The multiple samples (or measurements) can be aggregated (e.g., averaged, etc.) as discussed above to generate a crop loss value which is a combination of machine crop loss, header crop loss, and pre-harvest crop loss and the previously detected (at TIME 1) pre-harvest crop loss value and the previously detected (at TIME 2) header crop loss value (or the crop loss value that is a combination of the pre-harvest crop loss and header crop loss) can be deducted therefrom to generate a machine crop loss value.

The example shown in FIG. 10 corresponds to an example in which harvesting crop loss includes both header crop loss and machine crop loss.

Figure 11B:
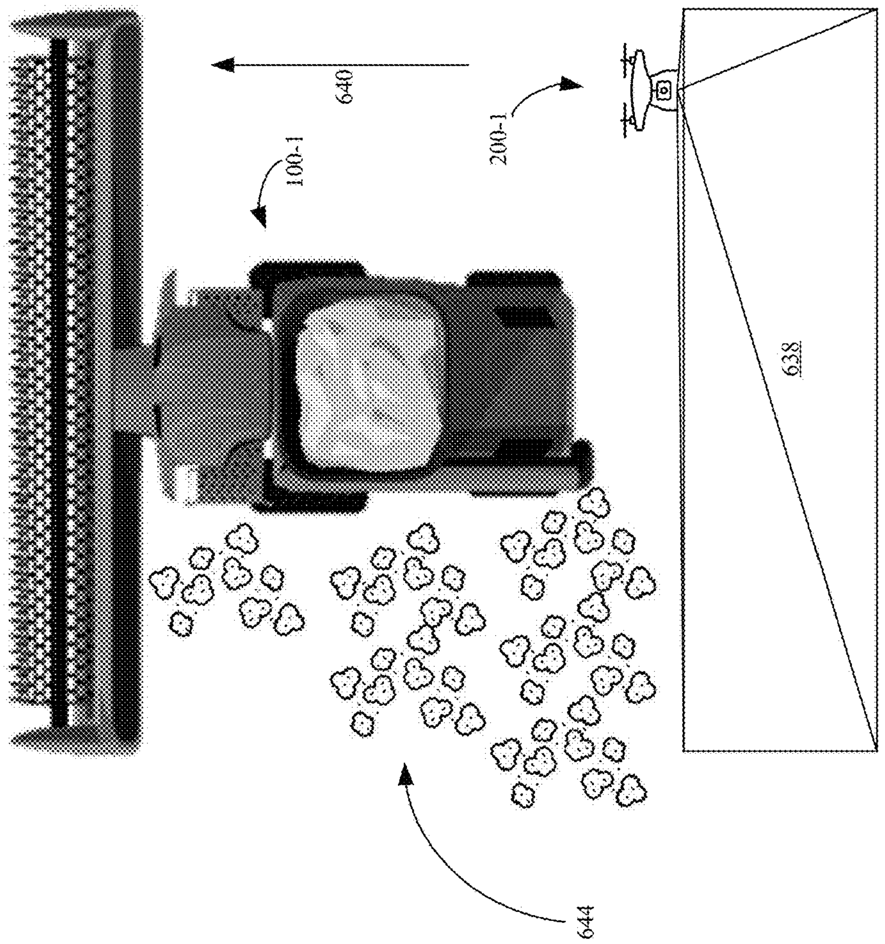
FIGS. 11A and 11B are pictorial illustrations illustrating example crop loss monitoring operations of the agricultural harvesting system architecture.
Figure 11A:
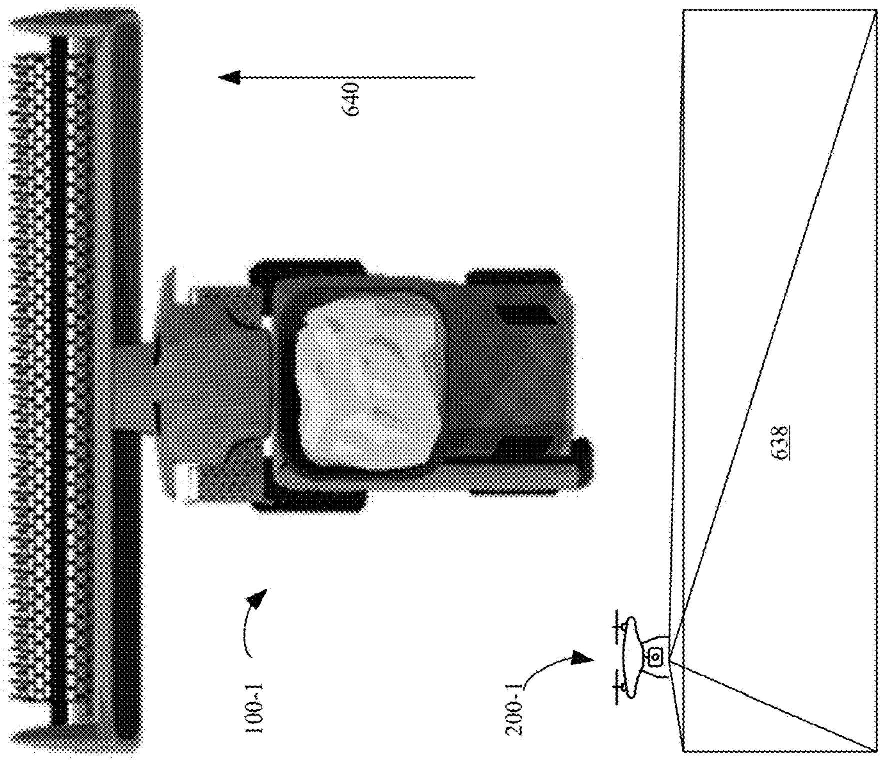

In one example, where harvesting crop loss does not include both header crop loss and machine crop loss, crop loss need only be detected two times (e.g., rather than, for instance, three times in an example where harvesting crop loss does include both header crop loss and machine crop loss), once (with either a single sample or multiple samples) ahead of the harvester to detect pre-harvest crop loss and once (with either a single sample or multiple samples) in an area extending behind a forward or distal end of the header or behind the harvester 100 to detect harvesting crop loss. In such an example, the crop loss value detected in the area extending behind a forward or distal end of the header or behind the harvester 100 will be a combination of pre-harvest crop loss and harvesting crop loss, from which the previously detected pre-harvest crop loss value can be deducted to generate a harvesting crop loss value. This is merely one example. It will be understood that, in other examples, a measurement area can be detected a different number of times, including in other examples where harvesting crop loss does not include both header crop loss and machine crop loss. Thus, the scope of the present disclosure is not limited to the examples described FIGS. 11A and 11B are pictorial illustrations showing example operations of system 500 in performing crop loss monitoring at a worksite. In the illustrated examples of FIGS. 11A and 11B, a drone 200 (illustratively a UAV 200-1 though could be a UGV 200-2) is controlled to perform crop loss monitoring rearward of harvester 100 (illustratively a combine harvester 100-1) as the harvester 100 operates at a worksite. In the illustrated examples, harvester 100 is traveling North at the worksite, as indicated by arrow 640.

In the illustrated examples of FIGS. 11A and 11B the drone 200 is monitoring crop loss to detect machine crop loss. Thus, crop loss monitoring system 235 generates a travel plan that positions the drone 200 to detect crop loss in a measurement area 638 associated with machine crop loss.

In the example shown in FIG. 11A, the travel plan positions the drone 200 to the left (or West of) the harvester 100 (though other positions are also contemplated) to detect crop loss in the measurement area 638. The crop loss value or machine crop loss value, or both, detected in area 638 can be utilized in control, such as in control of the harvester 100 or in control of other items of system 500.

In the example shown in FIG. 11B, crop loss monitoring system 235 has identified an obstruction 644 (illustratively a debris cloud). Crop loss monitoring system 235 further identifies future locations of the obstruction 644 based, at least, on one or more weather attributes (e.g., wind direction and speed). In the illustrated example of FIG. 11B, the wind direction is South by Southwest. Thus, crop loss monitoring system 235 generates a travel plan that positions the drone 200 to the right (or east of) the harvester 100 (though other positions are also contemplated) to account for the obstruction 644, and to detect crop loss in the measurement area 638. The crop loss value or machine crop loss value, or both, detected in area 638 can be utilized in control, such as in control of the harvester 100 or in control of other items of system 500.

It will be understood that a debris cloud is merely one example of an obstruction. In other examples a different type of obstruction can be present at the worksite. For example, as previously discussed, the chute of the harvester could be deployed (extending to the left or west of the harvester) and thus, the travel plan would position the drone 200 to account for the deployment of the chute.

Figure 12A:
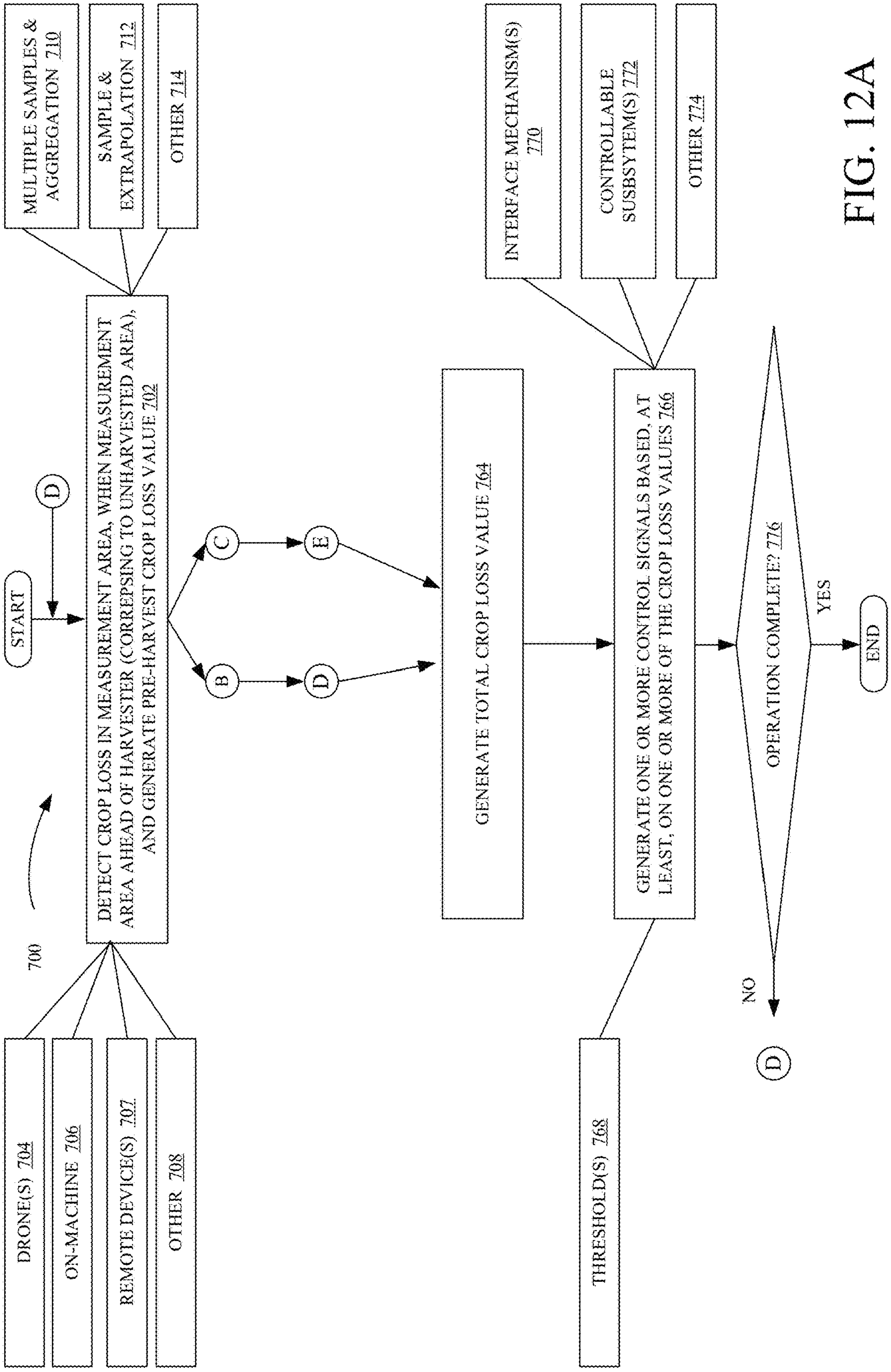
FIGS. 12A, 12B, and 12C (collectively referred to herein as FIG. 12) show a flow diagram illustrating one example operation of the agricultural harvesting system architecture in performing crop loss monitoring and machine control
Figure 12B:
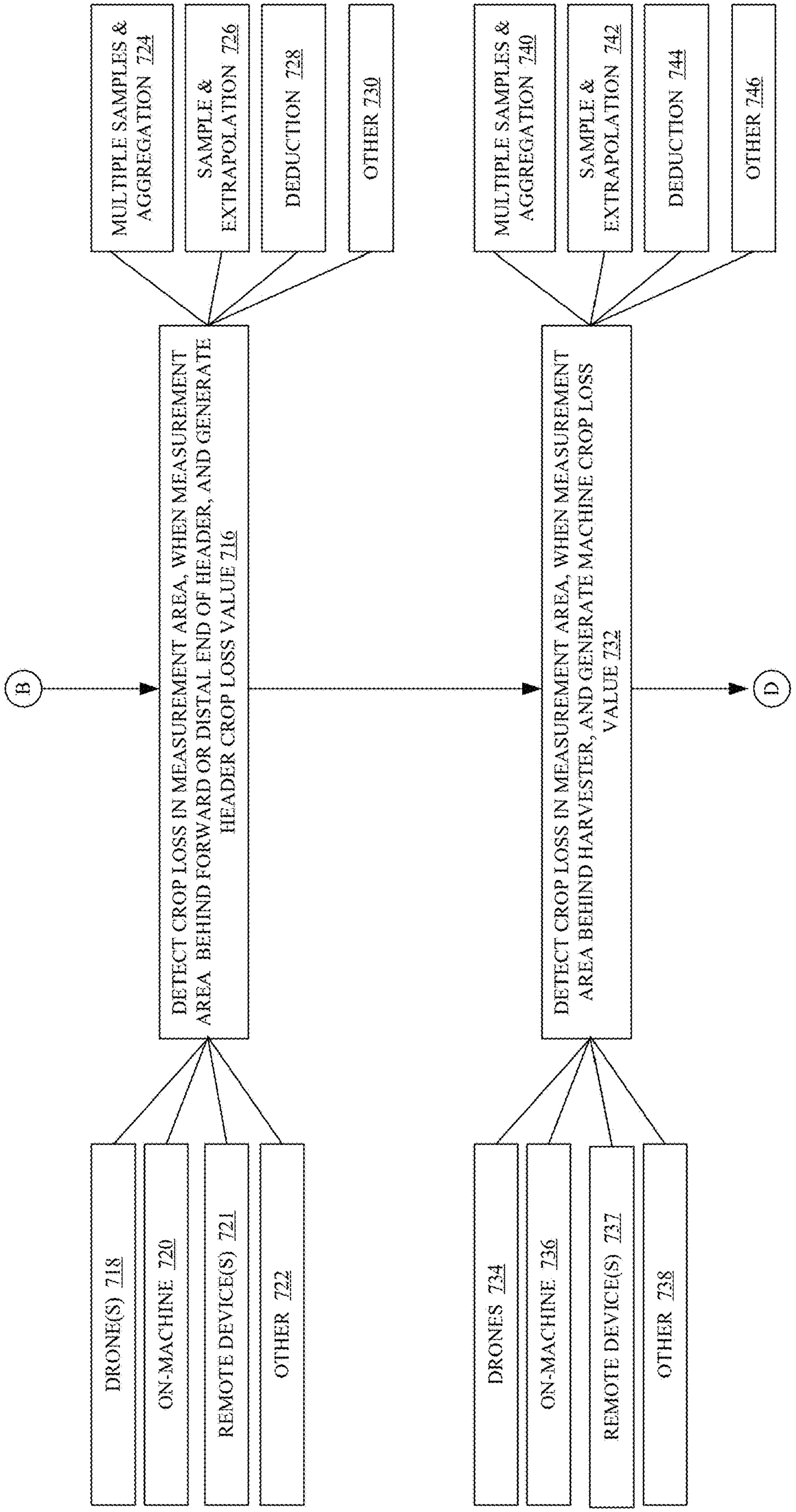
Figure 12C:
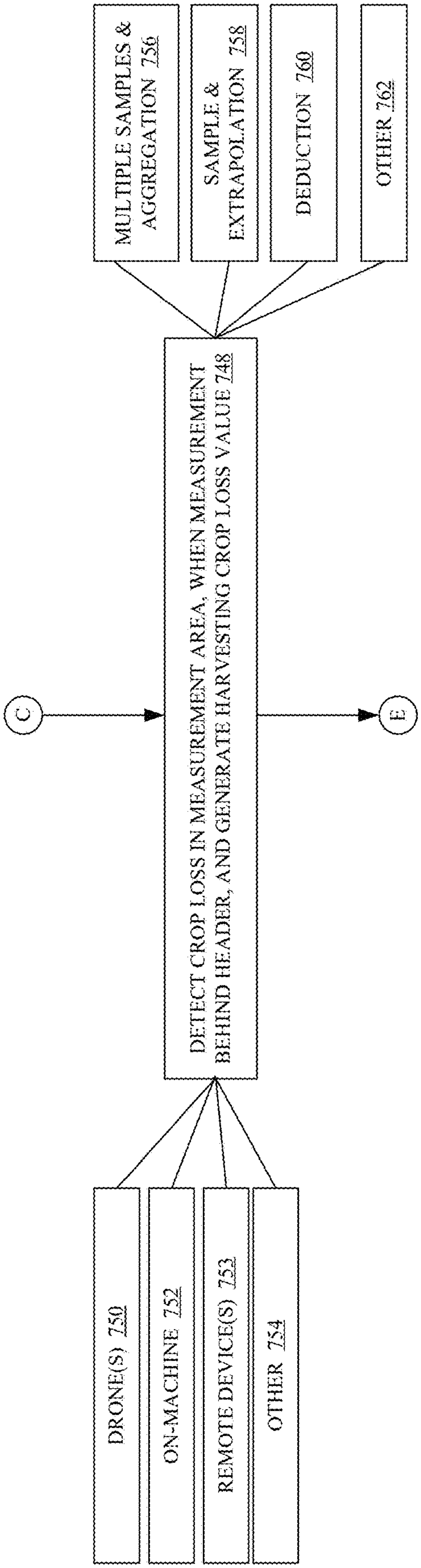

FIGS. 12A-12C (collectively referred to herein as FIG. 11) show a flow diagram illustrating an example operation 700 of agricultural system 500 in performing crop loss monitoring and control based thereon.

At block 702, crop loss sensor systems (e.g., 280, 427, or 527) detect crop loss in a measurement area when the measurement area is ahead of the harvester 100, relative to a travel direction or route of the harvester 100, corresponding to an unharvested area of the worksite, and generate sensor data (e.g., signal(s), image(s), etc.) based thereon. Crop loss monitoring system 235 generates a crop loss value (e.g., pre-harvest crop loss value) based on the sensor data. As indicated by block 704, in one example, the crop loss sensor systems are on one or more drones 200, communicably coupled (which can, in some examples, include physically coupling by a tether), such as crop loss sensor systems 280. The one or more drones 200 can be one or more of a UAV 200-1, a UGV 200-2, or another type of drone. As indicated by block 706, in one example, the crop loss sensor systems are mounted to the harvester 100, such as crop loss sensor systems 427. One example of such a crop loss sensor system 427 is crop loss sensor system 150-3. As indicated by block 707, in one example, the crop loss sensor systems are on one or more remote devices 520, such as crop loss sensor systems 527. As indicated by block 708, in one example, crop loss in the measurement area can be detected in other ways, such as with a combination of crop loss sensors systems on one or more drones 200, crop loss sensor systems on the harvester 100, and crop loss sensor systems on one or more remote devices 520.

As previously described, different sampling and value generation methods can be used to generate a pre-harvest crop loss value. As indicated by block 710, in one example, multiple samples (or measurements) of crop loss in the measurement area can be detected and aggregated (e.g., averaged) to generate the pre-harvest crop loss value. As indicated by block 712, in one example, a sample (or measurement) of crop loss can be detected and extrapolated (e.g., with a factor, an equation, a model, etc.) to generate the pre-harvest crop loss value. As indicated by block 712, in other examples, other sampling and value generation methods can be used.

In examples where harvesting crop loss includes both header crop loss and machine crop loss, processing proceeds from block 702 to block 716.

At block 716, crop loss sensor systems (e.g., 280 or 427) detect crop loss in the measurement area, when the measurement area is an area extending behind a forward or distal end of the header of the harvester 100 and ahead of a back end of the harvester, and generate sensor data (e.g., signal(s), image(s), etc.) based thereon. At block 716, crop loss monitoring system 235 generates a crop loss value (e.g., a first harvesting crop loss value (e.g., a header crop loss value)) based on the sensor data. As indicated by block 718, in one example, the crop loss sensor systems are on one or more drones 200, communicably coupled (which can, in some examples, include physically coupling by a tether), such as crop loss sensor systems 280. The one or more drones 200 can be one or more of a UAV 200-1, a UGV 200-2, or another type of drone. As indicated by block 720, in one example, the crop loss sensor systems are mounted to the harvester 100, such as crop loss sensor systems 427. One example of such a crop loss sensor system 427 is crop loss sensor system 150-2. As indicated by block 721, in one example, the crop loss sensor systems are on one or more remote devices 520, such as crop loss sensor systems 527. As indicated by block 722, in one example, crop loss in the measurement area can be detected in other ways, such as with a combination of crop loss sensors systems on one or more drones 200, crop loss sensor systems on the harvester 100, and crop loss sensor systems on one or more remote devices 520.

As previously described, different sampling and value generation methods can be used to generate a header crop loss value. As indicated by block 724, in one example, multiple samples (or measurements) of crop loss in the measurement area can be detected and aggregated (e.g., averaged) to generate a crop loss value which is a combination of pre-harvest crop loss and header crop loss from which the previously generated pre-harvest crop loss value can be deducted (as indicated by block 728) to generate the header crop loss value. As indicated by block 726, in one example, a sample (or measurement) of crop loss can be detected and extrapolated (e.g., with a factor, an equation, a model, etc.) to generate a crop loss value which is a combination of pre-harvest crop loss and header crop loss from which the previously generated pre-harvest crop loss value can be deducted (as indicated by block 728) to generate the header crop loss value. As indicated by block 730, in other examples, other sampling and value generation methods can be used.

Processing proceeds to block 732. At block 732, crop loss sensor systems (e.g., 280 or 427) detect crop loss in the measurement area when the measurement area is behind the harvester 100 and generate sensor data (e.g., signal(s), image(s), etc.) based thereon. At block 732, crop loss monitoring system 235 generates a crop loss value (e.g., a second harvesting crop loss value (e.g., a machine crop loss value)) based on the sensor data. As indicated by block 734, in one example, the crop loss sensor systems are on one or more drones 200, communicably coupled (which can, in some examples, include physically coupling by a tether), such as crop loss sensor systems 280. The one or more drones 200 can be one or more of a UAV 200-1, a UGV 200-2, or another type of drone. As indicated by block 736, in one example, the crop loss sensor systems are mounted to the harvester 100, such as crop loss sensor systems 427. One example of such a crop loss sensor system 427 is crop loss sensor system 150-1. As indicated by block 737, in one example, the crop loss sensor systems are on one or more remote devices 520, such as crop loss sensor systems 527. As indicated by block 738, in one example, crop loss in the measurement area can be detected in other ways, such as with a combination of crop loss sensors systems on one or more drones 200, crop loss sensor systems on the harvester 100, and crop loss sensor systems on one or more remote devices 520.

As previously described, different sampling and value generation methods can be used to generate a header crop loss value. As indicated by block 740, in one example, multiple samples (or measurements) of crop loss in the measurement area can be detected and aggregated (e.g., averaged) to generate a crop loss value (e.g., total crop loss value) which is a combination of pre-harvest crop loss, header crop loss, and machine crop loss from which the previously generated pre-harvest crop loss value and previously generated machine header can be deducted (as indicated by block 744) to generate the machine crop loss value. As indicated by block 742, in one example, a sample (or measurement) of crop loss can be detected and extrapolated (e.g., with a factor, an equation, a model, etc.) to generate a crop loss value (e.g., total crop loss value) which is a combination of pre-harvest crop loss, header crop loss, and machine crop loss from which the previously generated pre-harvest crop loss value and previously generated machine header can be deducted (as indicated by block 744) to generate the machine crop loss value. As indicated by block 746, in other examples, other sampling and value generation methods can be used.

In examples where harvesting crop loss does not include both header crop loss and machine crop loss, processing proceeds from block 702 to block 748.

At block 748, crop loss sensor systems (e.g., 280 or 427) detect crop loss in the measurement area, when the measurement area is in an area extending behind a forward or distal end of the header of the harvester 100 (the measurement area could also be behind the harvester 100 or could be behind the forward or distal end of the header but not yet behind the harvester 100), and generate sensor data (e.g., signal(s), image(s), etc.) based thereon. At block 748, crop loss monitoring system 235 generates a crop loss value (e.g., harvesting crop loss value) based on the sensor data. As indicated by block 750, in one example, the crop loss sensor systems are on one or more drones 200, communicably coupled (which can, in some examples, include physically coupling by a tether), such as crop loss sensor systems 280. The one or more drones 200 can be one or more of a UAV 200-1, a UGV 200-2, or another type of drone. As indicated by block 752, in one example, the crop loss sensor systems are mounted to the harvester 100, such as crop loss sensor systems 427. Some examples of such crop loss sensor systems 427 are crop loss sensor system 150-2 and crop loss sensor system 150-3. As indicated by block 753, in one example, the crop loss sensor systems are on one or more remote devices 520, such as crop loss sensor systems 527. As indicated by block 754, in one example, crop loss in the measurement area can be detected in other ways, such as with a combination of crop loss sensors systems on one or more drones 200, crop loss sensor systems on the harvester 100, and crop loss sensor systems on one or more remote devices 520.

As previously described, different sampling and value generation methods can be used to generate a harvesting crop loss value. As indicated by block 756, in one example, multiple samples (or measurements) of crop loss in the measurement area can be detected and aggregated (e.g., averaged) to generate a crop loss value (e.g., total crop loss value) which is a combination of pre-harvest crop loss and harvesting crop loss from which the previously generated pre-harvest crop loss value can be deducted (as indicated by block 760) to generate the harvesting crop loss value. As indicated by block 758, in one example, a sample (or measurement) of crop loss can be detected and extrapolated (e.g., with a factor, an equation, a model, etc.) to generate a crop loss value which is a combination of pre-harvest crop loss and harvesting crop loss from which the previously generated pre-harvest crop loss value can be deducted (as indicated by block 760) to generate the harvesting crop loss value. As indicated by block 762, in other examples, other sampling and value generation methods can be used.

Whether from block 732 or from block 748, processing proceeds to block 764. At block 764, crop loss monitoring system 235 generates a total crop loss value by aggregating the previously generated pre-harvest crop loss value and the previously generated harvesting crop loss value(s). In one example, when proceeding from block 732, crop loss monitoring system 235 generates a total crop loss value based on the pre-harvest crop loss value at block 702, the header crop loss value at block 716, and the machine crop loss value at block 732. In another example, when proceeding from block 732, crop loss monitoring system 235 generates a total crop loss value based on the crop loss detected in the measurement area at block 732. In one example, when proceeding from block 748, crop loss monitoring system 235 generates a total crop loss value based on the pre-harvest crop loss value at block 702 and the harvesting crop loss value at block 748. In another example, when proceeding from block 748, crop loss monitoring system 235 generates a total crop loss value based on the crop loss detected in the measurement area at block 748.

At block 766, system 500 (e.g., a control system 214 or a control system 414, or both) generate control signals based, at least, on one or more of the crop loss values. For instance, based on one or more of the pre-harvest crop loss value, the header crop loss value, the machine crop loss value, or the total crop loss value. In another instance, based on one or more of the pre-harvest crop loss value, the harvesting crop loss value, or the total crop loss value.

As indicated by block 768, system 500 may generate control signals based further on a comparison of each of the one or more crop loss values to a respective crop loss threshold value. For example, a pre-harvest value can be compared to a pre-harvest crop loss threshold value, a header crop loss value can be compared to a header crop loss threshold value, a machine crop loss value can be compared to a machine crop loss threshold value, a harvesting crop loss value can be compared to a harvesting crop loss threshold value, and a total crop loss value can be compared to a total crop loss threshold value.

As indicated by block 770, control signals can be generated to control one or more interface mechanisms (e.g., one or more of an interface mechanism 218, 418, or 364), such as to present (e.g., display etc.) the one or more crop loss values, or to generate an alert (e.g., based on the comparison(s) to threshold(s)), or to generate various other presentations.

Alternatively, or additionally, as indicated by block 772, control signals can be generated to control one or more controllable subsystems (e.g., one or more of a controllable subsystem 216 or a controllable subsystem 416).

Alternatively, or additionally, as indicated by block 774, control signals can be generated to control various other items of system 500.

It will be understood that, in some examples, control signals, such as those at block 766, can be generated after the generation of each value. For instance, in some examples, processing can proceed from block 702 (e.g., prior to proceeding to either block 716 or 748) to block 766 to generate control signals based on the pre-harvest crop loss value. In some examples, processing can proceed from block 716 (e.g., prior to proceeding to block 732) to block 766 to generate control signals based on the header crop loss value. In some examples, processing can proceed from block 732 (e.g., prior to proceeding to block 764) to block 766 to generate control signals based on the machine crop loss value. In some examples, processing can proceed from block 748 (e.g., prior to proceeding to block 764) to block 766 to generate control signals based on the harvesting crop loss value.

At block 776 it is determined if the operation at the worksite is complete. If the operation at the worksite is not complete, then processing returns to block 702. If the operation at the worksite is complete, then processing ends.

Figure 13:
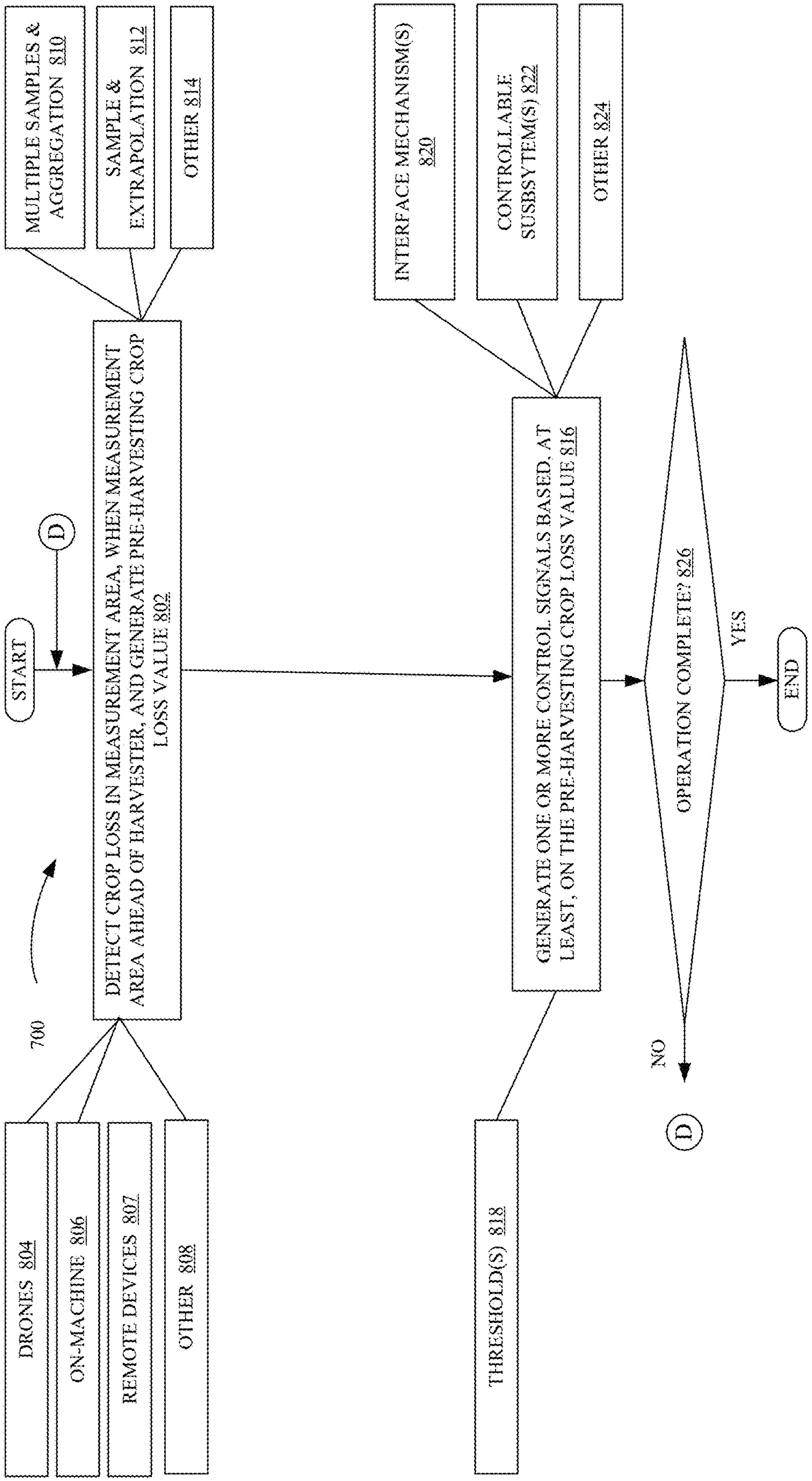
FIG. 13 shows a flow diagram illustrating one example operation of the agricultural harvesting system architecture in performing pre-harvest crop loss monitoring and machine control.

FIG. 13 shows a flow diagram illustrating an example operation 800 of agricultural system 500 in performing pre-harvest crop loss monitoring and control based thereon.

At block 802, crop loss sensor systems (e.g., 280 or 427) detect crop loss in a measurement area when the measurement area is ahead of the harvester 100 and generate sensor data (e.g., signal(s), image(s), etc.) based thereon and crop loss monitoring system 235 generates a crop loss value (e.g., pre-harvest crop loss value) based on the sensor data. As indicated by block 804, in one example, the crop loss sensor systems are on one or more drones 200, communicably coupled (which can, in some examples, include physically coupling by a tether), such as crop loss sensor systems 280. The one or more drones 200 can be one or more of a UAV 200-1, a UGV 200-2, or another type of drone. As indicated by block 806, in one example, the crop loss sensor systems are mounted to the harvester 100, such as crop loss sensor systems 427. One example of such a crop loss sensor system 427 is crop loss sensor system 150-3. As indicated by block 807, in one example, the crop loss sensor systems are on one or more remote devices 520, such as crop loss sensor systems 527. As indicated by block 808, in one example, crop loss in the measurement area can be detected in other ways, such as with a combination of crop loss sensors systems on one or more drones 200, crop loss sensor systems on the harvester 100, and crop loss sensor systems on one or more remote devices 520.

As previously described, different sampling and value generation methods can be used to generate a pre-harvest crop loss value. As indicated by block 810, in one example, multiple samples (or measurements) of crop loss in the measurement area can be detected and aggregated (e.g., averaged) to generate the pre-harvest crop loss value. As indicated by block 812, in one example, a sample (or measurement) of crop loss can be detected and extrapolated (e.g., with a factor, an equation, a model, etc.) to generate the pre-harvest crop loss value. As indicated by block 814, in other examples, other sampling and value generation methods can be used.

At block 816, system 500 (e.g., a control system 214 or a control system 414, or both) generate control signals based, at least, on the pre-harvest crop loss value.

As indicated by block 818, system 500 may generate control signals based further on a comparison of the pre-harvest crop loss value to a pre-harvest crop loss threshold value.

As indicated by block 820, control signals can be generated to control one or more interface mechanisms (e.g., one or more of an interface mechanism 218, 418, or 364), such as to present (e.g., display etc.) the pre-harvest crop loss value, or to generate an alert (e.g., based on the comparison to the threshold), or to generate various other presentations.

Alternatively, or additionally, as indicated by block 822, control signals can be generated to control one or more controllable subsystems (e.g., one or more of a controllable subsystem 216 or a controllable subsystem 416).

Alternatively, or additionally, as indicated by block 824, control signals can be generated to control various other items of system 500.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms can include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition can be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores can be local to the systems accessing the data stores, one or more of the data stores can all be located remote form a system utilizing the data store, or one or more data stores can be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality can be distributed among more components. In different examples, some functionality can be added, and some can be removed.

It will be noted that the above discussion has described a variety of different systems, logic, controllers, components, and interactions. It will be appreciated that any or all of such systems, logic, controllers, components, and interactions can be implemented by hardware items, such as one or more processors, one or more processors executing computer executable instructions stored in memory, memory, or other processing components, some of which are described below, that perform the functions associated with those systems, logic, controllers, components, or interactions. In addition, any or all of the systems, logic, controllers, components, and interactions can be implemented by software that is loaded into a memory and is subsequently executed by one or more processors or one or more servers or other computing component(s), as described below. Any or all of the systems, logic, controllers, components, and interactions can also be implemented by different combinations of hardware, software, firmware, etc., some examples of which are described below. These are some examples of different structures that can be used to implement any or all of the systems, logic, controllers, components, and interactions described above. Other structures can be used as well.

Figure 14:
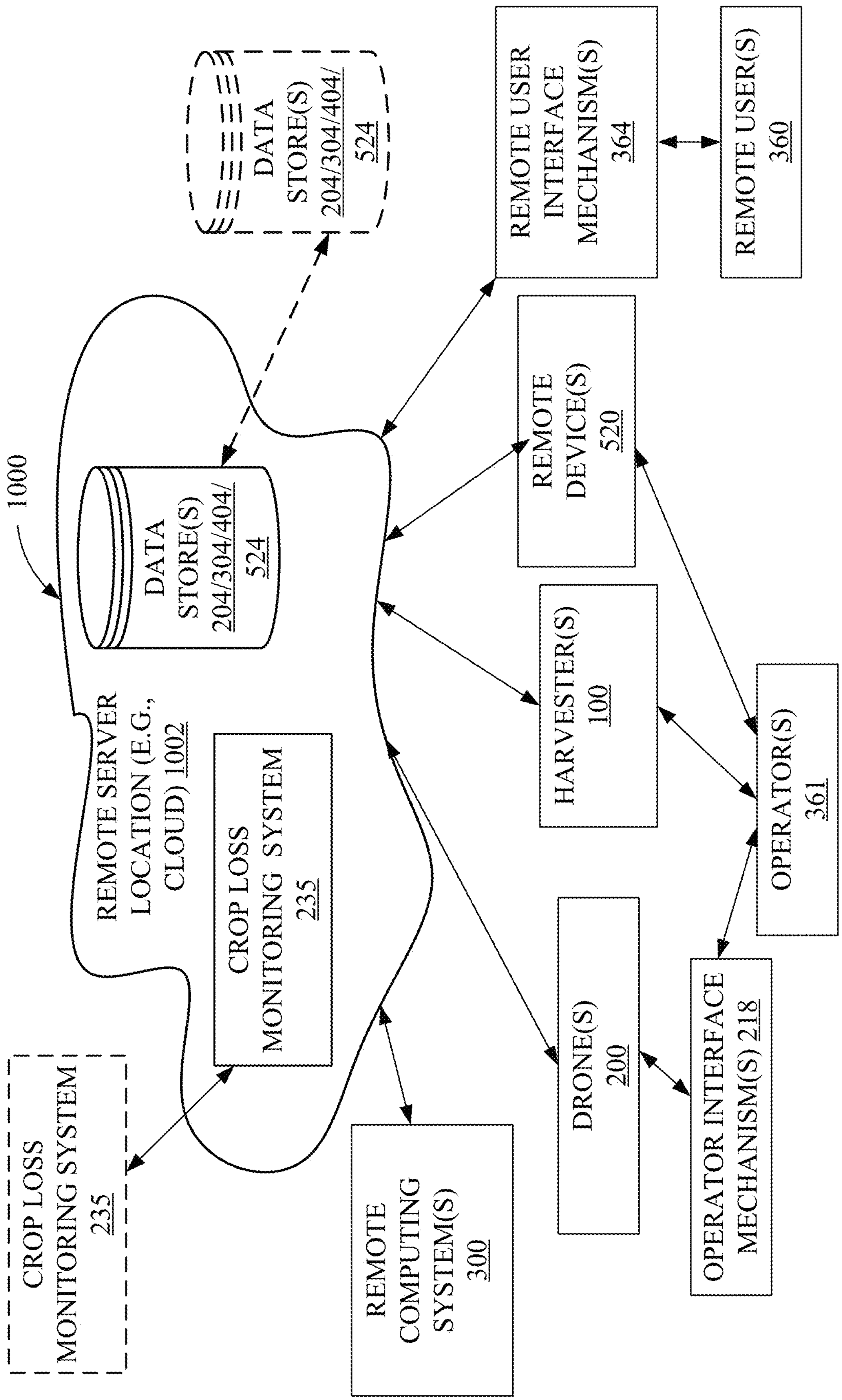
FIG. 14 is a block diagram showing one example of items of an agricultural harvesting system architecture in communication with a remote server architecture.

FIG. 14 is a block diagram of a remote server architecture 1000. FIG. 14, also shows one or more harvesters 100, one or more drones 200, one or more remote computing systems 300, and one or more remote user interface mechanisms 364 in communication with the remote server environment. The harvesters 100, drones 200, remote computing systems 300, and remote user interface mechanisms 364 communicate with elements in a remote server architecture 1000. In some examples, remote server architecture 1000 provides computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and can be accessible through a web browser or any other computing component. Software or components shown in previous figures as well as data associated therewith, can be stored on servers at a remote location. The computing resources in a remote server environment can be consolidated at a remote data center location, or the computing resources can be dispersed to a plurality of remote data centers. Remote server infrastructures can deliver services through shared data centers, even though the services appear as a single point of access for the user. Thus, the components and functions described herein can be provided from a remote server at a remote location using a remote server architecture. Alternatively, the components and functions can be provided from a server, or the components and functions can be installed on client devices directly, or in other ways.

In the example shown in FIG. 14, some items are similar to those shown in previous figures and those items are similarly numbered. FIG. 14 specifically shows that crop loss monitoring system 235, data stores 204, data stores 304, data stores 404, or data stores 524, or a combination thereof, can be located at a server location 1002 that is remote from the harvesters 100, drones 200, remote computing systems 300, remote devices 520, and remote user interface mechanisms 364. Therefore, in the example shown in FIG. 14, harvesters 100, drones 200, remote computing systems 300, remote devices 520, and remote user interface mechanisms 364 access systems through remote server location 1002. In other examples, various other items can also be located at server location 1002, such as various other items of agricultural harvesting system architecture 500.

FIG. 14 also depicts another example of a remote server architecture. FIG. 14 shows that some elements of previous figures can be disposed at a remote server location 1002 while others can be located elsewhere. By way of example, one or more of data store(s) 204, 304, 404, or 524 can be disposed at a location separate from location 1002 and accessed via the remote server at location 1002. Similarly, crop loss monitoring system 235 can be disposed at a location separate from location 1002 and accessed via the remote server at location 1002. Regardless of where the elements are located, the elements can be accessed directly by harvesters 100, drones 200, remote computing systems 300, remote devices 520, and remote user interface mechanisms 364 through a network such as a wide area network or a local area network; the elements can be hosted at a remote site by a service; or the elements can be provided as a service or accessed by a connection service that resides in a remote location. Also, data can be stored in any location, and the stored data can be accessed by, or forwarded to, operators, users, or systems. For instance, physical carriers can be used instead of, or in addition to, electromagnetic wave carriers. In some examples, where wireless telecommunication service coverage is poor or nonexistent, another machine, such as a fuel truck or other mobile machine or vehicle, can have an automated, semi-automated or manual information collection system. As a mobile machine (e.g., harvester 100 or drone 200) comes close to the machine containing the information collection system, such as a fuel truck prior to fueling, or other mobile machine or vehicle, the information collection system collects the information from the mobile machine (e.g., harvester 100 or drone 200) using any type of ad-hoc wireless connection. The collected information can then be forwarded to another network when the machine containing the received information reaches a location where wireless telecommunication service coverage or other wireless coverage is available. For instance, a fuel truck, can enter an area having wireless communication coverage when traveling to a location to fuel other machines or when at a main fuel storage location. Other mobile machines or vehicles can enter an area having wireless communication coverage when traveling to other locations or when at another location. All of these architectures are contemplated herein. Further, the information can be stored on a mobile machine (e.g., harvester 100 or drone 200) until the mobile machine enters an area having wireless communication coverage. The mobile machine (e.g., harvester 100 or drone 200), itself, can send the information to another network.

It will also be noted that the elements of previous figures, or portions thereof, can be disposed on a wide variety of different devices. One or more of those devices can include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1000 can include cybersecurity measures. Without limitation, these measures can include encryption of data on storage devices, encryption of data sent between network nodes, authentication of people or processes accessing data, as well as the use of ledgers for recording metadata, data, data transfers, data accesses, and data transformations. In some examples, the ledgers can be distributed and immutable (e.g., implemented as blockchain).

Figure 15:
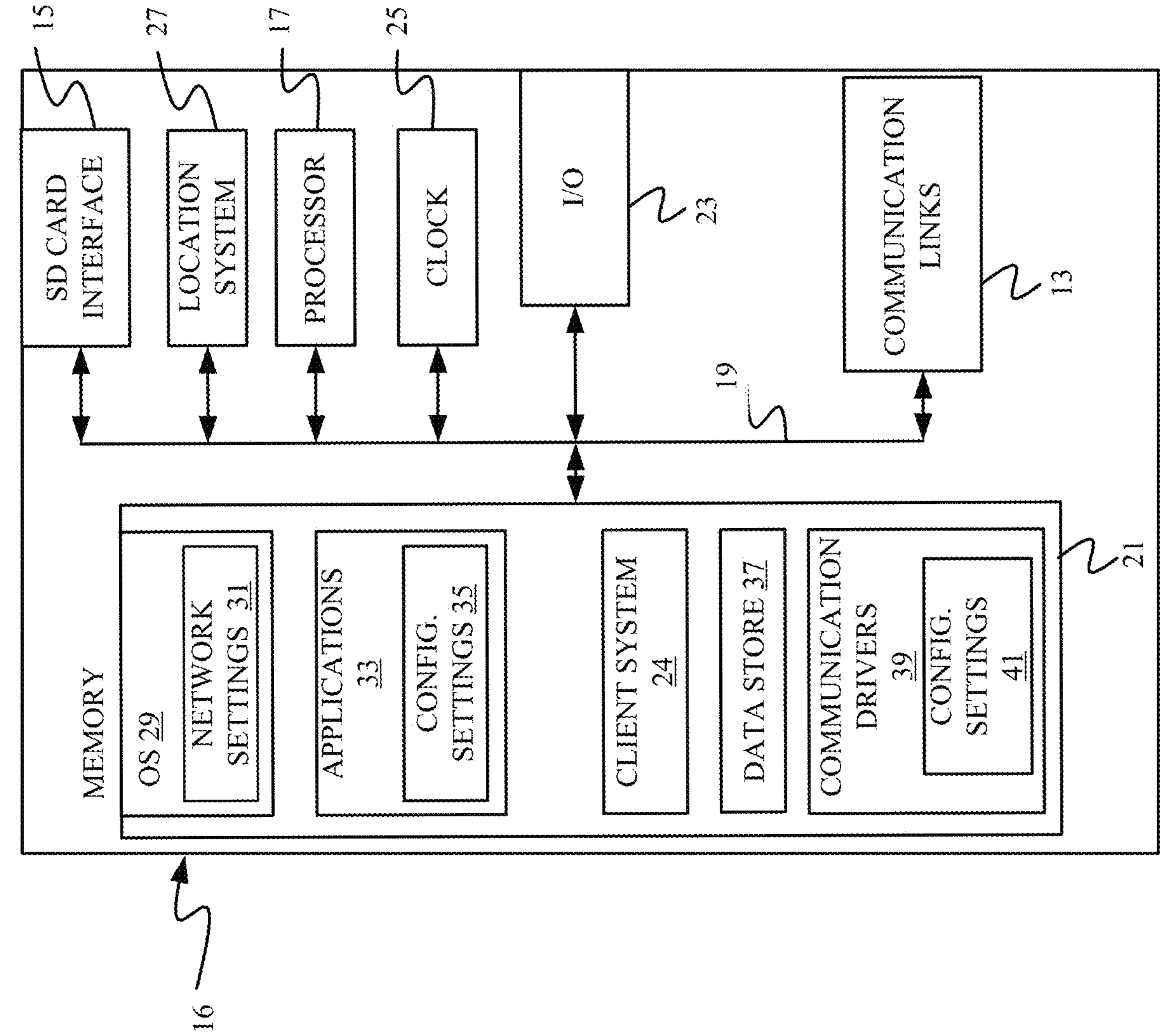
FIGS. 15, 16, and 17 show examples of mobile devices that can be used in an agricultural harvesting system architecture.
Figure 16:
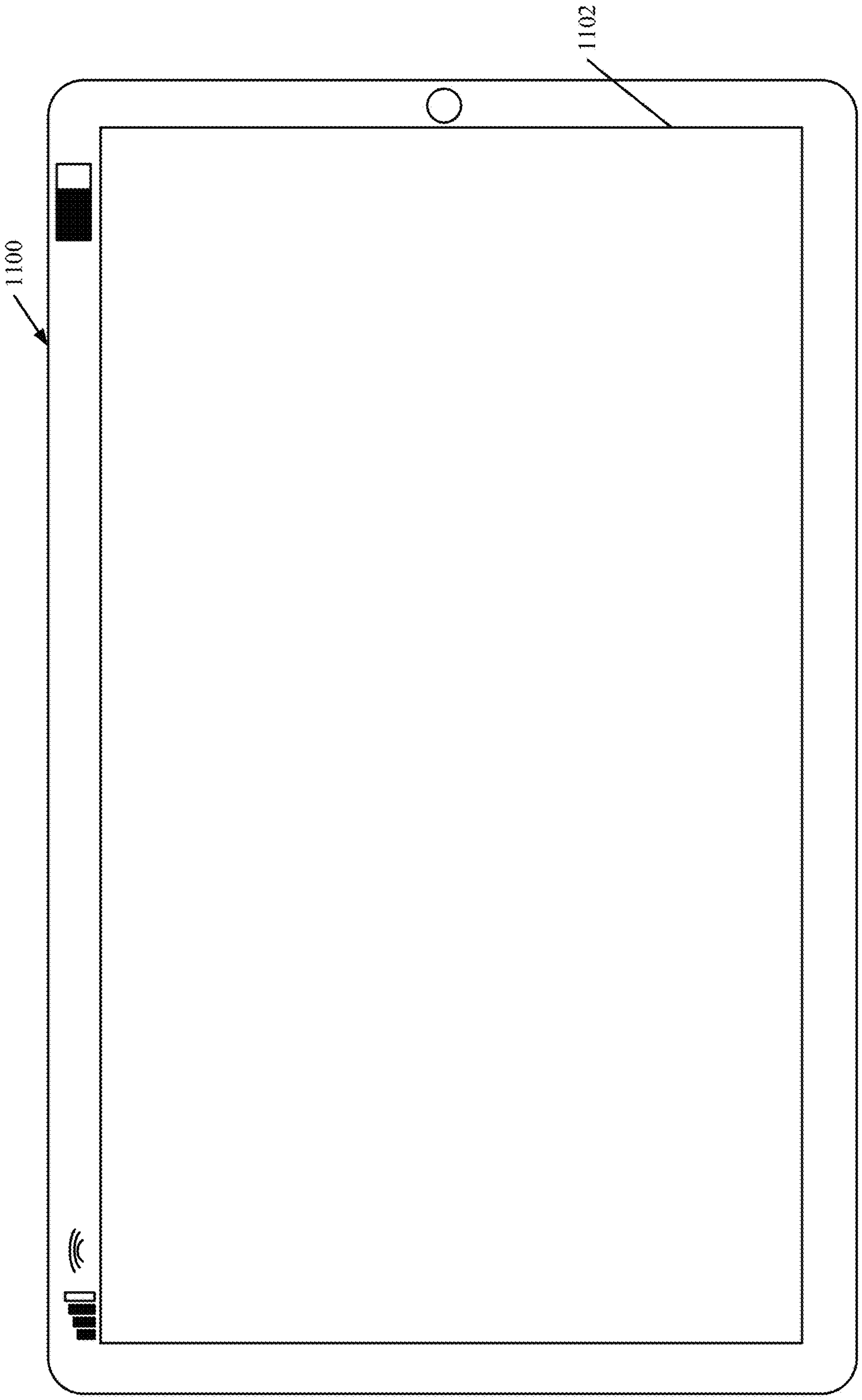
Figure 17:
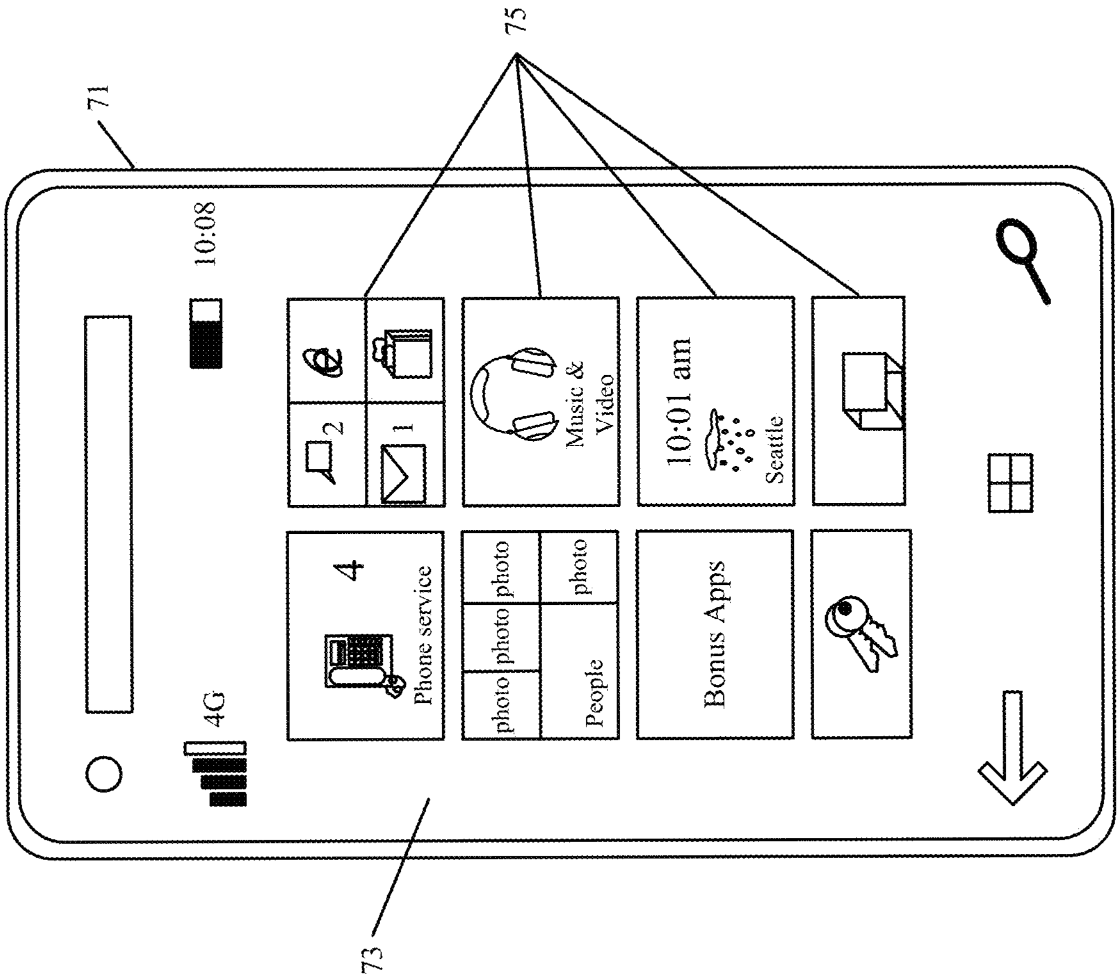

FIG. 15 is a simplified block diagram of one illustrative example of a handheld or mobile computing device that can be used as a user's or client's handheld device 16, in which the present system (or parts of it) can be deployed. For instance, a mobile device can be deployed in the operator compartment of a mobile machine (e.g., harvester 100) or can be communicably coupled to a mobile machine (e.g., harvester 100 or drone 200) for use in generating, processing, or displaying the outputs (e.g., 360) discussed above. FIGS. 16 and 17 are examples of handheld or mobile devices.

FIG. 15 provides a general block diagram of the components of a client device 16 that can run some components shown in previous figures, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, client system 24, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 16 shows one example in which device 16 is a tablet computer 1100. In FIG. 16, computer 1100 is shown with user interface display screen 1102. Screen 1102 can be a touch screen or a pen-enabled interface that receives inputs from a pen or stylus. Tablet computer 1100 can also use an on-screen virtual keyboard. Of course, computer 1100 can also be attached to a keyboard or other user input device through a suitable attachment mechanism, such as a wireless link or USB port, for instance. Computer 1100 can also illustratively receive voice inputs as well.

FIG. 17 is similar to FIG. 16 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 18:
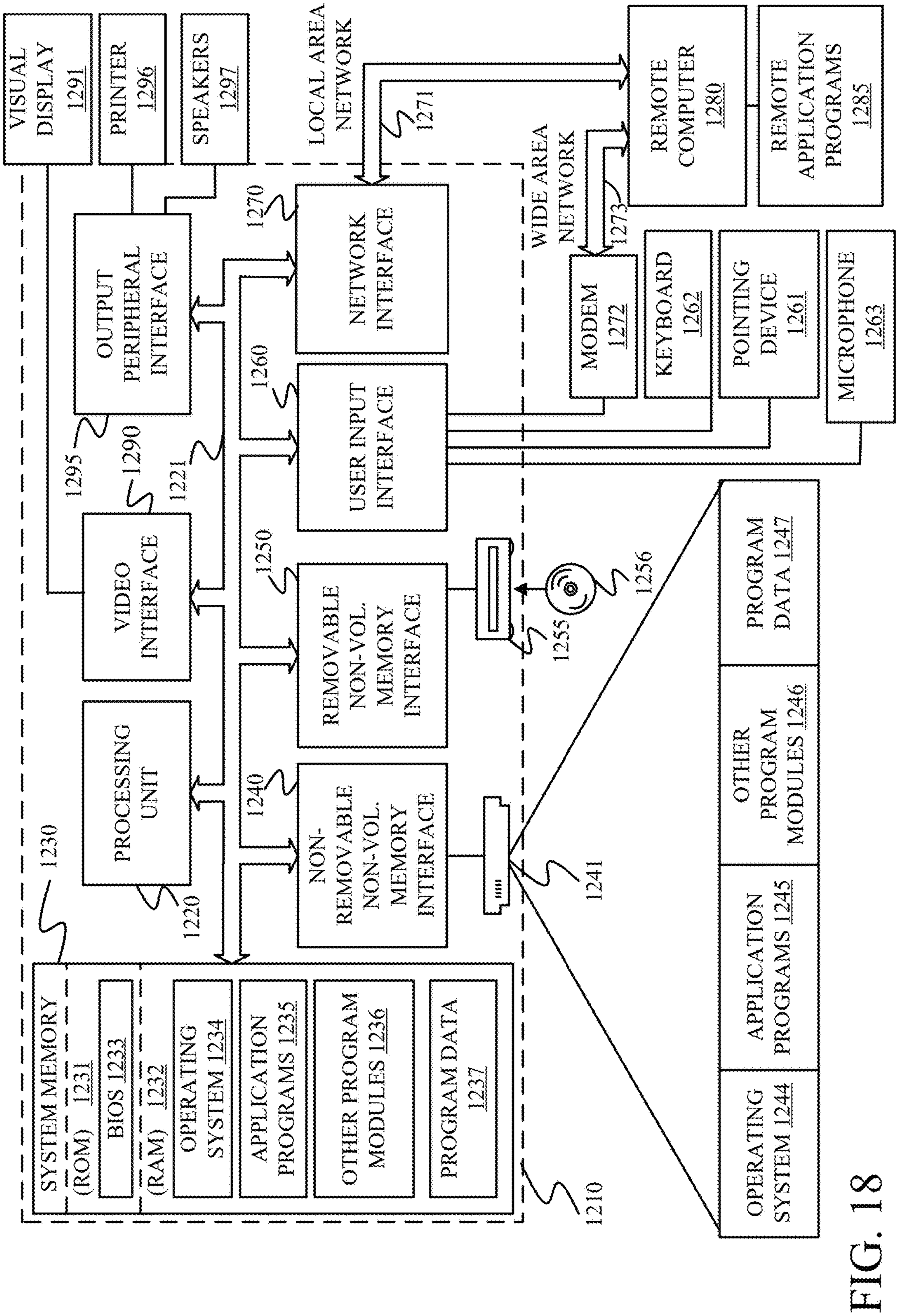
FIG. 18 is a block diagram showing one example of a computing environment that can be used in an agricultural system.

FIG. 18 is one example of a computing environment in which elements of previous figures described herein can be deployed. With reference to FIG. 18, an example system for implementing some embodiments includes a computing device in the form of a computer 1210 programmed to operate as discussed above. Components of computer 1210 can include, but are not limited to, a processing unit 1220 (which can comprise processors or servers from previous figures), a system memory 1230, and a system bus 1221 that couples various system components including the system memory to the processing unit 1220. The system bus 1221 can be any of several types of bus structures including a memory bus or memory controller, a peripheral bus, and a local bus using any of a variety of bus architectures. Memory and programs described with respect to previous figures described herein can be deployed in corresponding portions of FIG. 18.

Computer 1210 typically includes a variety of computer readable media. Computer readable media can be any available media that can be accessed by computer 1210 and includes both volatile and nonvolatile media, removable and non-removable media. By way of example, and not limitation, computer readable media can comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media can embody computer readable instructions, data structures, program modules or other data in a transport mechanism and includes any information delivery media. The term “modulated data signal” means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 18 illustrates operating system 1234, application programs 1235, other program modules 1236, and program data 1237.

The computer 1210 can also include other removable/non-removable volatile/nonvolatile computer storage media. By way of example only, FIG. 18 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), quantum computers, etc.

The drives and their associated computer storage media discussed above and illustrated in FIG. 18, provide storage of computer readable instructions, data structures, program modules and other data for the computer 1210. In FIG. 18, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user can enter commands and information into the computer 1210 through input devices such as a keyboard 1262, a microphone 1263, and a pointing device 1261, such as a mouse, trackball or touch pad. Other input devices (not shown) can include a joystick, game pad, satellite dish, scanner, or the like. These and other input devices are often connected to the processing unit 1220 through a user input interface 1260 that is coupled to the system bus, but can be connected by other interface and bus structures. A visual display 1291 or other type of display device is also connected to the system bus 1221 via an interface, such as a video interface 1290. In addition to the monitor, computers can also include other peripheral output devices such as speakers 1297 and printer 1296, which can be connected through an output peripheral interface 1295.

The computer 1210 is operated in a networked environment using logical connections (such as a controller area network—CAN, local area network—LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules can be stored in a remote memory storage device. FIG. 18 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. A computer implemented crop loss monitoring method comprising:

detecting crop loss in a measurement area when the measurement area corresponds to an unharvested area of a field;

generating pre-harvest crop loss sensor data indicative of the crop loss detected in the measurement area when the measurement area corresponds to the unharvested area of the field;

identifying a pre-harvest crop loss value based on the pre-harvest crop loss sensor data;

detecting crop loss in the measurement area when the measurement area is behind a distal end of a header of a harvester;

generating harvesting crop loss sensor data indicative of the crop loss detected in the measurement area when the measurement area is behind the distal end of the header;

identifying a harvesting crop loss value based on the harvesting crop loss sensor data and the pre-harvest crop loss value; and generating one or more control signals based on at least one of the pre-harvest crop loss value or the harvesting crop loss value.

2. The computer implemented crop loss monitoring method of claim 1, wherein detecting crop loss in the measurement area when the measurement area is behind the distal end of the header of the harvester comprises detecting crop loss in the measurement area when the measurement area is behind the distal end of the header of the harvester and ahead of a back end of the harvester and detecting crop loss in the measurement area when the measurement area is behind the back end of the harvester;

wherein generating harvesting crop loss sensor data indicative of the crop loss detected in the measurement area when the measurement area is behind the distal end of the header comprises generating header crop loss sensor data indicative of the crop loss detected in the measurement area when the measurement area is behind the distal end of the header and ahead of the back end of the harvester and generating machine crop loss sensor data indicative of the crop loss detected in the measurement area when the measurement area is behind the back end of the harvester; and wherein identifying the harvesting crop loss value comprises identifying a header crop loss value based on the header crop loss sensor data and the pre-harvest crop loss value and identifying a machine crop loss value based on the machine crop loss sensor data and the header crop loss value; and wherein generating the one or more control signals comprises generating the one or more control signals based on at least one of the pre-harvest crop loss value, the header crop loss value, or the machine crop loss value.

3. The computer implemented crop loss monitoring method of claim 1, wherein detecting crop loss in the measurement area when the measurement area corresponds to the unharvested area of the field comprises detecting a plurality of samples of crop loss in the measurement area when the measurement area corresponds to the unharvested area of the field and wherein identifying the pre-harvest crop loss value comprises aggregating the plurality of samples of crop loss.

4. The computer implemented crop loss monitoring method of claim 1, wherein detecting crop loss in the measurement area when the measurement area is behind the distal end of the header of the harvester comprises detecting a plurality of samples of crop loss in the measurement area when the measurement area is behind the distal end of the header of the harvester and wherein identifying the harvesting crop loss value comprises aggregating the plurality of samples of crop loss.

5. The computer implemented crop loss monitoring method of claim 1, wherein identifying the pre-harvest crop loss value comprises extrapolating the crop loss detected in the measurement area when the measurement area corresponds to the unharvested area of the field to generate the pre-harvest crop loss value as representative of pre-harvest crop loss corresponding to an area of the field larger than the measurement area.

6. The computer implemented crop loss monitoring method of claim 2, wherein identifying the header crop loss value comprises extrapolating the crop loss detected in the measurement area when the measurement area is behind the distal end of the header of the harvester to generate the harvesting crop loss value as representative of harvesting crop loss corresponding to an area of the field larger than the measurement area.

7. The computer implemented crop loss monitoring method of claim 1, wherein detecting crop loss in the measurement area when the measurement area corresponds to the unharvested area of the field comprises detecting, with one or more crop loss sensors on a drone communicably coupled to the harvester, crop loss in the measurement area when the measurement area corresponds to the unharvested area of the field.

8. The computer implemented crop loss monitoring method of claim 1, wherein detecting crop loss in the measurement area when the measurement area is behind the distal end of the header of the harvester comprises detecting, with one or more crop loss sensors on a drone communicably coupled to the harvester, crop loss in the measurement area when the measurement area is behind the distal end of the header of the harvester.

9. The computer implemented crop loss monitoring method of claim 1, wherein generating the one or more control signals comprises at least one of:

(i) generating a control signal to control an interface mechanism to present at least one of the pre-harvest crop loss value or the harvesting crop loss value; or (ii) generating a control signal to control a controllable subsystem of the harvester.

10. The computer implemented crop loss monitoring method of claim 1 and further comprising identifying a total crop loss value based, at least, on the harvesting crop loss sensor data.

11. An agricultural system comprising:

one or more crop loss sensors configured to:

detect crop loss in a measurement area when the measurement area corresponds to an unharvested area of a field; and detect crop loss in the measurement area when the measurement area is behind a distal end of a header of a harvester;

one or more processors; and memory storing instructions executable by the one or more processors that, when executed by the one or more processors, cause the one or more processors to:

identify a pre-harvest crop loss value based on the detected crop loss in the measurement area when the measurement area corresponds to the unharvested area of the field;

identify a harvesting crop loss value based on the detected crop loss in the measurement area when the measurement area is behind the distal end of the header of the harvester and the pre-harvest crop loss value; and generate one or more control signals based on at least one of the pre-harvest crop loss value or the harvesting crop loss value.

12. The agricultural system of claim 11, wherein the one or more crop loss sensors are configured to detect crop loss in the measurement area when the measurement area is behind the distal end of the header of the harvester and ahead of a back end of the harvester and to detect crop loss in the measurement area when the measurement area is behind the back end of the harvester;

wherein the harvest crop loss value comprises a first harvest crop loss value and wherein the instructions, when executed by the one or more processors, cause the one or more processors to:

identify, as the first harvest crop loss value, a header crop loss value based on the detected crop loss in the measurement area when the measurement area is behind the distal end of the header of the harvester and ahead of the back end of the harvester;

identify, as a second harvest crop loss value, a machine crop loss value based on the detected crop loss in the measurement area when the measurement area is behind the back end of the harvester; and generating the one or more control signals based on at least one of the pre-harvest crop loss value, the header crop loss value, or the machine crop loss value.

13. The agricultural system of claim 11, wherein the one or more crop loss sensors include an at least one crop loss sensor on a drone communicably coupled to the harvester and configured to detect crop loss in the measurement area when the measurement area corresponds to the unharvested area of the field.

14. The agricultural system of claim 11, wherein the one or more crop loss sensors include an at least one crop loss sensor on a drone communicably coupled to the harvester and configured to detect crop loss in the measurement area when the measurement area is behind the distal end of the header of the harvester.

15. The agricultural system of claim 11, wherein the one or more control signals include a control signal that controls an interface mechanism to present at least one of the pre-harvest crop loss value or the harvesting crop loss value.

16. The agricultural system of claim 11, wherein the one or more control signals control an at least one controllable subsystem of the harvester.

17. A computer implemented crop loss monitoring method comprising:

identifying a pre-harvest crop loss value based on crop loss detected at a first time in a first measurement area;

identifying, as a first harvesting crop loss value, a header crop loss value based on crop loss detected at a second time in the first measurement area or in a second measurement area;

identifying, as a second harvesting crop loss value, a machine crop loss value based on crop loss detected at a third time in the first measurement area, the second measurement area, or a third measurement area; and generating one or more control signals based on at least one of the pre-harvest crop loss value, the header crop loss value, or the machine crop loss value.

18. The computer implemented crop loss monitoring method of claim 17, wherein generating the one or more control signals comprises generating one or more control signals to control at least one controllable subsystem of a reaping machine.

19. The computer implemented crop loss monitoring method of claim 17, wherein the one or more control signals control an at least one controllable subsystem of a harvester.

20. The computer implemented crop loss monitoring method of claim 17, wherein the one or more control signals include a control signal that controls an interface mechanism to present the at least one of the pre-harvest crop loss value, the header crop loss value, or the machine crop loss value.

* * * * *